US011917114B2

(12) United States Patent
Hirose et al.

(10) Patent No.: US 11,917,114 B2
(45) Date of Patent: Feb. 27, 2024

(54) IMAGE FORMING APPARATUS AND CONTROL METHOD FOR OBTAINING PARAMETERS FOR IMAGE POSITION ADJUSTMENT

(71) Applicant: CANON KABUSHIKI KAISHA, Tokyo (JP)

(72) Inventors: Fumiaki Hirose, Saitama (JP); Keita Hidaka, Ibaraki (JP); Eri Okuda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/160,943

(22) Filed: Jan. 27, 2023

(65) Prior Publication Data

US 2023/0262182 A1 Aug. 17, 2023

(30) Foreign Application Priority Data

Feb. 14, 2022 (JP) ................................ 2022-020120
Feb. 15, 2022 (JP) ................................ 2022-020967
Mar. 1, 2022 (JP) ................................ 2022-030630
Nov. 28, 2022 (JP) ................................ 2022-188903

(51) Int. Cl.
*H04N 1/00* (2006.01)

(52) U.S. Cl.
CPC ..... *H04N 1/00761* (2013.01); *H04N 1/00721* (2013.01)

(58) Field of Classification Search
None
See application file for complete search history.

(56) References Cited

U.S. PATENT DOCUMENTS

2003/0128401 A1* 7/2003 Conrow ............. H04N 1/00053 358/300
2018/0173478 A1* 6/2018 Hayakawa ........... G06K 15/027
2022/0311877 A1* 9/2022 Shao ........................ H04N 1/58

FOREIGN PATENT DOCUMENTS

JP 2016111628 A 6/2016

* cited by examiner

*Primary Examiner* — Andrew H Lam
(74) *Attorney, Agent, or Firm* — Canon U.S.A., Inc. IP Docketing

(57) ABSTRACT

There is provided an image forming apparatus capable of preventing deterioration in accuracy of image position adjustment due to erroneous detection of a marker.

10 Claims, 20 Drawing Sheets

PLEASE SELECT FEED CASSETTE ON WHICH SHEET OF TYPE TO BE CORRECTED IS SET.

- MANUAL FEED TRAY: EMPTY
- 1 : A4  — 408
- 2 : A3  — 409
- 3 : A3

410 — PRINT START

PLEASE SET NUMBER OF TEST PAGES TO BE OUTPUT.

− | 5 | +

412

OK

READ PRINTED TEST PAGES BY FEEDER.

402
403 READING START

PLEASE SET SHEETS IN DISPLAYED ORIENTATION.

FIG.8A

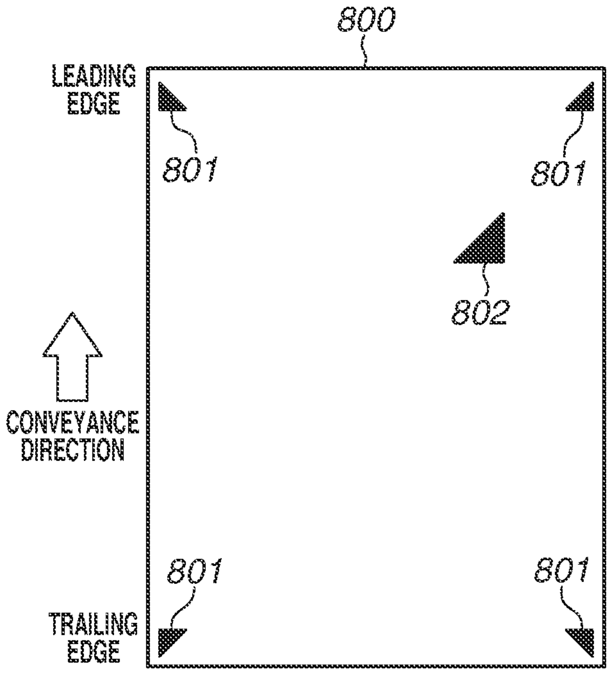

FIG.8B

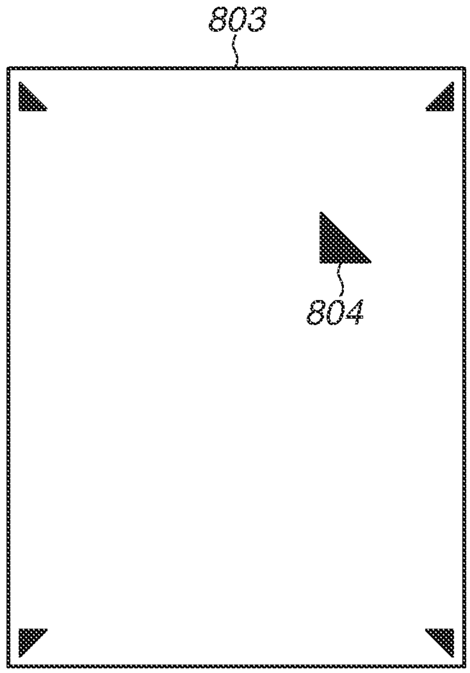

FIG.8C

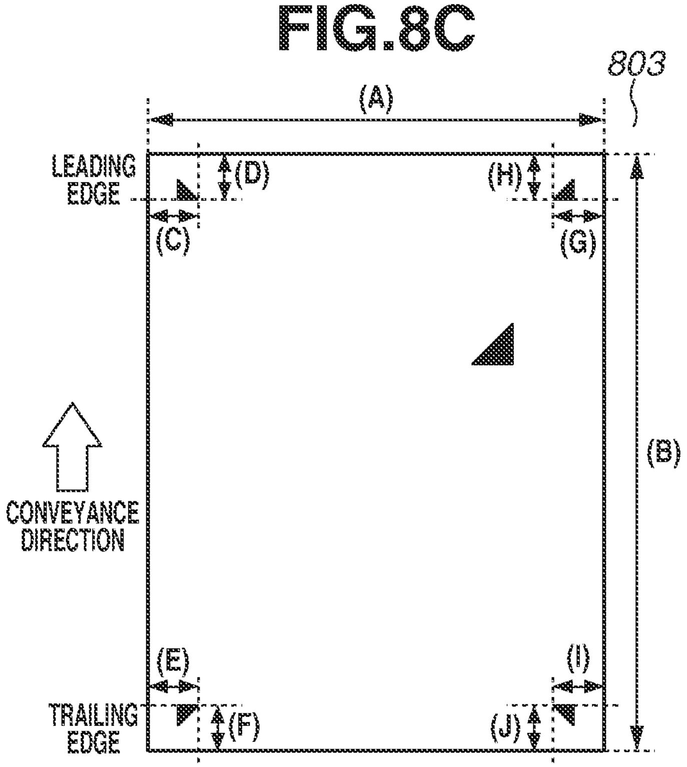

FIG.8D

| FRONT/BACK | FRONT |
|---|---|
| (A) MAIN-SCANNING SHEET SIZE | 2973 |
| (B) SUB-SCANNING SHEET SIZE | 4201 |
| (C) UPPER LEFT MARKER EDGE (MAIN-SCANNING) | 99 |
| (D) UPPER LEFT MARKER EDGE (SUB-SCANNING) | 99 |
| (E) LOWER LEFT MARKER EDGE (MAIN-SCANNING) | 100 |
| (F) LOWER LEFT MARKER EDGE (SUB-SCANNING) | 101 |
| (G) UPPER RIGHT MARKER EDGE (MAIN-SCANNING) | 100 |
| (H) UPPER RIGHT MARKER EDGE (SUB-SCANNING) | 101 |
| (I) LOWER RIGHT MARKER EDGE (MAIN-SCANNING) | 101 |
| (J) LOWER RIGHT MARKER EDGE (SUB-SCANNING) | 100 |

UNITS: 0.1mm

| | MEASURED VALUE (1411) | IDEAL VALUE (1412) | ADJUSTMENT VALUE (1413) |
|---|---|---|---|
| LEADING EDGE WRITE START POSITION (1414) | ((D)+(H))/2 | 10 mm | MEASURED VALUE – IDEAL VALUE |
| LEFT EDGE WRITE START POSITION (1415) | ((C)+(E))/2 | 10 mm | MEASURED VALUE – IDEAL VALUE |
| MAIN-SCANNING MAGNIFICATION (1416) | (((A)-(C)-(G))+((A)-(E)-(I)))/2 | SHEET LENGTH IN MAIN-SCANNING DIRECTION – 20 mm | (MEASURED VALUE – IDEAL VALUE) / IDEAL VALUE |
| SUB-SCANNING MAGNIFICATION (1417) | (((B)-(D)-(F))+((B)-(H)-(J)))/2 | SHEET LENGTH IN SUB-SCANNING DIRECTION – 20 mm | (MEASURED VALUE – IDEAL VALUE) / IDEAL VALUE |

| | SET OF ADJUSTMENT VALUES (1421) | |
|---|---|---|
| MAIN-SCANNING WRITE START POSITION (FRONT SURFACE) | +3 (pix) | 1422 |
| SUB-SCANNING WRITE START POSITION (FRONT SURFACE) | +2 (pix) | |
| MAIN-SCANNING MAGNIFICATION (FRONT SURFACE) | -0.01 (%) | |
| SUB-SCANNING MAGNIFICATION (FRONT SURFACE) | -0.01 (%) | |
| MAIN-SCANNING WRITE START POSITION (BACK SURFACE) | -1 (pix) | 1423 |
| SUB-SCANNING WRITE START POSITION (BACK SURFACE) | +1 (pix) | |
| MAIN-SCANNING MAGNIFICATION (BACK SURFACE) | +0.01 (%) | |
| SUB-SCANNING MAGNIFICATION (BACK SURFACE) | +0.01 (%) | |

| | DOCUMENT UPPER LEFT | DOCUMENT UPPER RIGHT | DOCUMENT LOWER RIGHT | DOCUMENT LOWER LEFT | UPPER LEFT MARKER | UPPER RIGHT MARKER | LOWER RIGHT MARKER | LOWER LEFT MARKER |
|---|---|---|---|---|---|---|---|---|
| FIRST PAGE | x1, y1 | x2, y2 | x3, y3 | x4, y4 | x5, y5 | x6, y6 | x7, y7 | x8, y8 |
| SECOND PAGE | x'1, y'1 | x'2, y'2 | x'3, y'3 | x'4, y'4 | x'5, y'5 | x'6, y'6 | x'7, y'7 | x'8, y'8 |
| ⋮ | ⋮ | ⋮ | ⋮ | ⋮ | ⋮ | ⋮ | ⋮ | ⋮ |
| NINTH PAGE | x''1, y''1 | x''2, y''2 | x''3, y''3 | x''4, y''4 | x''5, y''5 | x''6, y''6 | x''7, y''7 | x''8, y''8 |
| TENTH PAGE | x'''1, y'''1 | x'''2, y'''2 | x'''3, y'''3 | x'''4, y'''4 | x'''5, y'''5 | x'''6, y'''6 | x'''7, y'''7 | x'''8, y'''8 |

| | DOCUMENT UPPER LEFT | DOCUMENT UPPER RIGHT | DOCUMENT LOWER RIGHT | DOCUMENT LOWER LEFT | UPPER LEFT MARKER | UPPER RIGHT MARKER | LOWER RIGHT MARKER | LOWER LEFT MARKER |
|---|---|---|---|---|---|---|---|---|
| FIRST PAGE | x1, y1 | x2, y2 | x3, y3 | x4, y4 | x5, y5 | x6, y6 | x7, y7 | x8, y8 |
| SECOND PAGE | x'1, y'1 | x'2, y'2 | x'3, y'3 | x'4, y'4 | x'5, y'5 | x'6, y'6 | x'7, y'7 | x'8, y'8 |
| ⋮ | ⋮ | ⋮ | ⋮ | ⋮ | ⋮ | ⋮ | ⋮ | ⋮ |
| NINTH PAGE | X-x''3, Y-y''3 | X-x''4, Y-y''4 | X-x''1, Y-y''1 | X-x''2, Y-y''2 | X-x''7, Y-y''7 | X-x''8, Y-y''8 | X-x''5, Y-y''5 | X-x''6, Y-y''6 |
| TENTH PAGE | X-x'''3, Y-y'''3 | X-x'''4, Y-y'''4 | X-x'''1, Y-y'''1 | X-x'''2, Y-y'''2 | X-x'''7, Y-y'''7 | X-x'''8, Y-y'''8 | X-x'''5, Y-y'''5 | X-x'''6, Y-y'''6 |

IMAGE FORMING APPARATUS AND CONTROL METHOD FOR OBTAINING PARAMETERS FOR IMAGE POSITION ADJUSTMENT

BACKGROUND OF THE DISCLOSURE

Field of the Disclosure

The present disclosure relates to an image forming apparatus and a control method for the image forming apparatus.

Description of the Related Art

A function for adjusting an image forming position on a sheet (this function is hereinafter referred to as "image position adjustment") has been used in printing apparatuses (image processing apparatuses) that form an image on a sheet. Japanese Patent Application Laid-Open No. 2016-111628 discusses a technique in which marks for adjustment printed on a sheet are read by a reading device and a positional relationship between the marks and the sides of the sheet is obtained to thereby obtain parameters for image position adjustment. An auto document feeding device called an auto document feeder (ADF) is described as an example of the reading device. The parameters for image position adjustment are parameters that are affected by a cut shape of each cut sheet. Accordingly, work for obtaining the parameters for image position adjustment is performed for each type of sheet.

As discussed in Japanese Patent Application Laid-Open No. 2016-111628, the configuration for obtaining the coordinates for adjustment based on a rectangular pattern has a room for improvement. If dust is present on a reading unit of the ADF, a stripe-like pattern extending in a sub-scanning direction can be generated on the read image. Such a stripe-like pattern can be erroneously detected as the rectangular pattern and the coordinates used for correction calculation cannot be accurately obtained.

SUMMARY OF THE DISCLOSURE

According to an aspect of the present disclosure, an image forming apparatus includes an image forming unit configured to form an image on a sheet, a reading unit configured to read the image while conveying the sheet, a unit configured to cause the image forming unit to execute image forming processing to form an image of a predetermined pattern on a sheet, and a unit configured to acquire an adjustment value to be used for further image forming processing based on a result of reading the sheet by the reading unit, the sheet having the image of the predetermined pattern formed thereon, wherein the image of the predetermined pattern includes a marker located near a corner of the sheet, and the marker is a filled-in area surrounded by a plurality of sides including a side that is not parallel to a short side and a long side of the sheet.

Further features of the present disclosure will become apparent from the following description of exemplary embodiments with reference to the attached drawings.

BRIEF DESCRIPTION OF THE DRAWINGS

FIG. 8A illustrates the front surface of an adjustment chart, FIG. 8B illustrates the back surface of the adjustment chart, FIG. 8C illustrates each measurement area on the adjustment chart, and FIG. 8D illustrates a specific example of each measurement area.

FIG. 10A illustrates a relationship among a measured value, an ideal value, and an adjustment value, and FIG. 10B illustrates specific examples of the adjustment value.

FIG. 18A illustrates a list of coordinate information before coordinate transformation, and FIG. 18B illustrates a list of coordinate information after coordinate transformation.

DESCRIPTION OF THE EMBODIMENTS

Exemplary embodiments of the present disclosure will be described in detail below with reference to the drawings. The following exemplary embodiments are not meant to limit the scope of the present disclosure as encompassed by the claims. Not all of the combinations of components and processes described in the exemplary embodiments are indispensable for the solution to the issues of the present disclosure. Some or all of the components and processes described in the exemplary embodiments may be replaced with equivalents. Some of the components and processes may be omitted.

A first exemplary embodiment of the present disclosure will be described. The present exemplary embodiment illustrates an example of an image forming apparatus having a configuration in which an image forming unit prints an adjustment chart (correction chart) on a sheet and an image reading unit reads the adjustment chart to acquire an adjustment value for an image position (printing position).

<System>

Figure 1A:
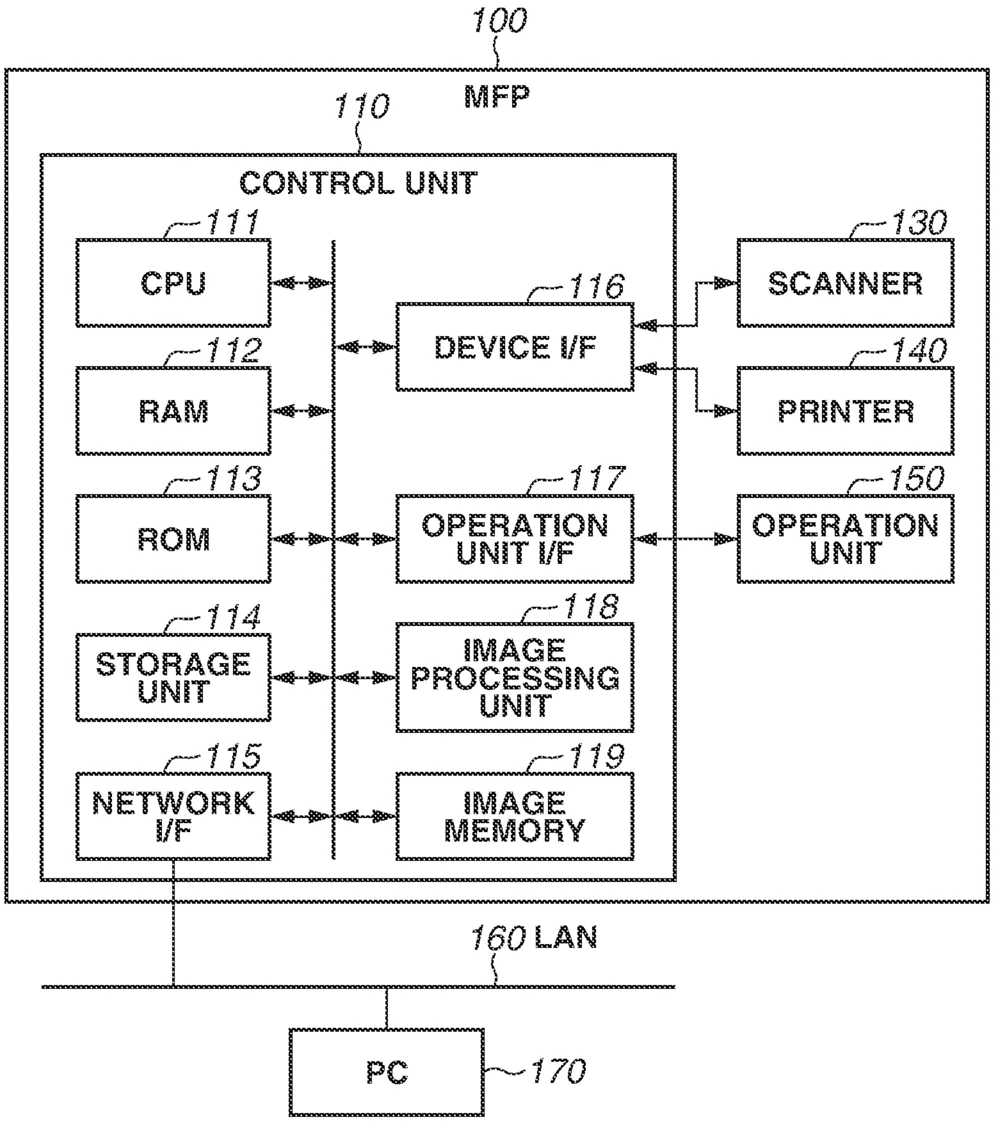
FIG. 1A is a block diagram illustrating a configuration of a multi-function peripheral (MFP)

FIG. 1A is a block diagram illustrating a system for a multi-function peripheral (MFP) 100 used as an image forming apparatus. As illustrated in FIG. 1A, in the system according to the present exemplary embodiment, the MFP 100 used as an image forming apparatus is communicably connected to a personal computer (PC) 170 via a local area network (LAN) 160. The MFP 100 receives data on a print job and the like from the PC 170 via the LAN 160.

Figure 3:
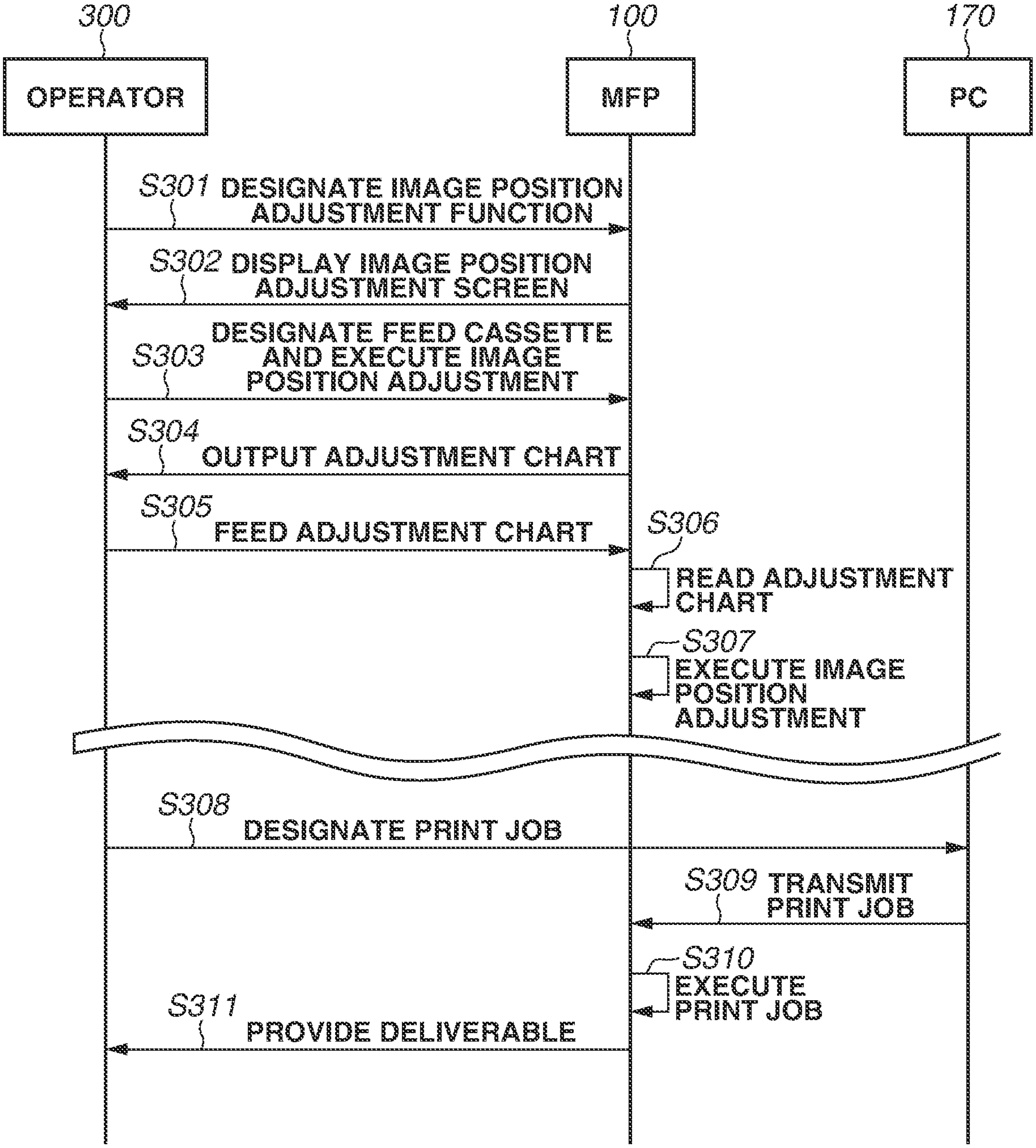
FIG. 3 is a sequence diagram illustrating an example of using a system according to an exemplary embodiment of the present disclosure.

FIG. 3 is a sequence diagram illustrating an example of using the system. In the present exemplary embodiment, a main information exchange operation is performed between an operator 300 and the MFP 100. Processing to be performed in a state where a cassette library editing screen is displayed will now be described.

In step S301, the operator 300 issues an instruction to start image position adjustment processing.

In step S302, the image forming apparatus 100 determines that the MFP 100 starts the image position adjustment processing and displays an image position adjustment screen.

In step S303, after checking the image position adjustment screen, the operator 300 designates a feed cassette to be adjusted, sets an image position adjustment execution method and the like, and issues an instruction to execute the image position adjustment processing. According to this instruction, the MFP 100 starts the image position adjustment processing.

In step S304, the MFP 100 outputs adjustment charts. The output adjustment charts (output products) are placed and stacked on a discharge unit of the MFP 100. In this case, one or more adjustment charts may be output. The number of adjustment charts to be output may be preliminarily set, or may be designated by the operator 300. Along with the output of each adjustment chart, the MFP 100 displays an adjustment chart reading screen.

In step S305, the operator 300 places the output adjustment chart on the image reading unit according to a notification on the reading screen, and issues an instruction to start reading.

In step S306, the MFP 100 performs processing for reading the adjustment chart placed on the image reading unit.

In step S307, the MFP 100 acquires the adjustment value for the image position based on an image read from the adjustment chart.

In the present exemplary embodiment, the image position adjustment processing on the feed cassette is performed as described above. Further, image forming processing is performed as described below using an image position shift amount (adjustment value) registered for each feed cassette.

In step S308, the operator 300 uses a host computer to designate a print job to be output by the MFP 100, make settings, and issue an execution instruction. For example, the operator 300 sets the print job to perform printing using sheets in a specific cassette, and then the operator 300 issues an instruction to execute the print job.

In step S309, the host computer transmits the print job designated by the operator 300 to the MFP 100.

In step S310, the MFP 100 executes the print job using sheets in the specific cassette. In this case, the image position shift amount registered in the specific cassette is read from a cassette library, and the image position shift amount is applied in the execution of the print job.

In step S311, the MFP 100 provides a deliverable obtained after the image position is adjusted.

As described above in a series of processes, in a state where the image position shift amount is associated with sheets in each feed cassette by the image position adjustment processing, adjustment processing using the image position shift amount is performed when the print job using the sheets in the feed cassette is executed. Consequently, the image position adjustment processing can be easily applied during execution of the print job, which leads to a reduction in workload on the operator 300.

<MFP>

As illustrated in FIG. 1A, the MFP 100 includes a control unit 110, a scanner 130, a printer 140, and an operation unit 150.

The scanner 130 is a reading unit (reading device) that reads an image on a document.

The printer 140 is an image forming unit (image forming device) that forms an image on a sheet.

The operation unit 150 is a user interface (operation panel) that outputs information to the operator 300 and receives an instruction from the operator 300. The operation unit 150 includes a display (display unit) and a speaker as a configuration to output information. The operation unit 150 includes a touch panel and hardware keys as a configuration to input information.

The control unit 110 is a controller that controls the components included in the MFP 100 in an integrated manner. The control unit 110 is connected to each of the scanner 130 and the printer 140, and controls input and output of image information.

As a minimum configuration for the controller, the control unit 110 includes a central processing unit (CPU) 111, a random access memory (RAM) 112, and a read-only memory (ROM) 113. The control unit 110 includes a storage unit 114, a network interface (I/F) 115, a device I/F 116, an operation unit I/F 117, an image processing unit 118, and an image memory 119. These units are interconnected via a communication unit such as a bus.

The CPU 111 is a general-purpose processor that performs various kinds of arithmetic processing.

The RAM 112 is a volatile memory that functions as a working memory for the CPU 111.

The ROM 113 is a non-volatile memory that stores various programs such as system boot programs.

The storage unit 114 is a storage that stores information. For example, a hard disk drive (HDD) or a solid-state drive (SSD) is used as the storage unit 114. The storage unit 114 stores system software, image data, programs for controlling the operation of the MFP 100, and the like.

The programs stored in the storage unit 114 are loaded into the RAM 112. The CPU 111 controls the operation of the MFP 100 based on the programs loaded into the RAM 112.

The network I/F 115 is a communication interface for connecting to a network. The network I/F 115 is connected to the LAN 160 to input and output kinds of various information via the network. The network I/F 115 may be any type of interface compliant with one or both of wired communication and wireless communication.

The device I/F 116 connects the control unit 110 to the scanner 130 and the printer 140 as image input/output devices, and performs image data synchronous/asynchronous conversion.

The operation unit I/F 117 is an interface for connecting the operation unit 150 and the control unit 110. The operation unit I/F 117 outputs output information such as image data to display information on the display of the operation unit 150. The operation unit I/F 117 transmits input information input by a user using the operation unit 150 to the CPU 111.

The image processing unit 118 is a processor or a circuit group dedicated to image processing. The image processing unit 118 performs image processing on print data received via the LAN 160. The image processing unit 118 also performs image processing on image data that is input to and output from the device I/F 116.

The image memory 119 is a memory into which image data to be processed by the image processing unit 118 is temporarily loaded.

Sheets to be used for printing in the MFP 100 are managed by the operator 300 using a database called the cassette library. The cassette library is stored in the storage unit 114 or the RAM 112, and is read and written, as needed, by each software module. The cassette library is a known technique, and thus the detailed description thereof is omitted.

<Scanner>

Figure 1B:
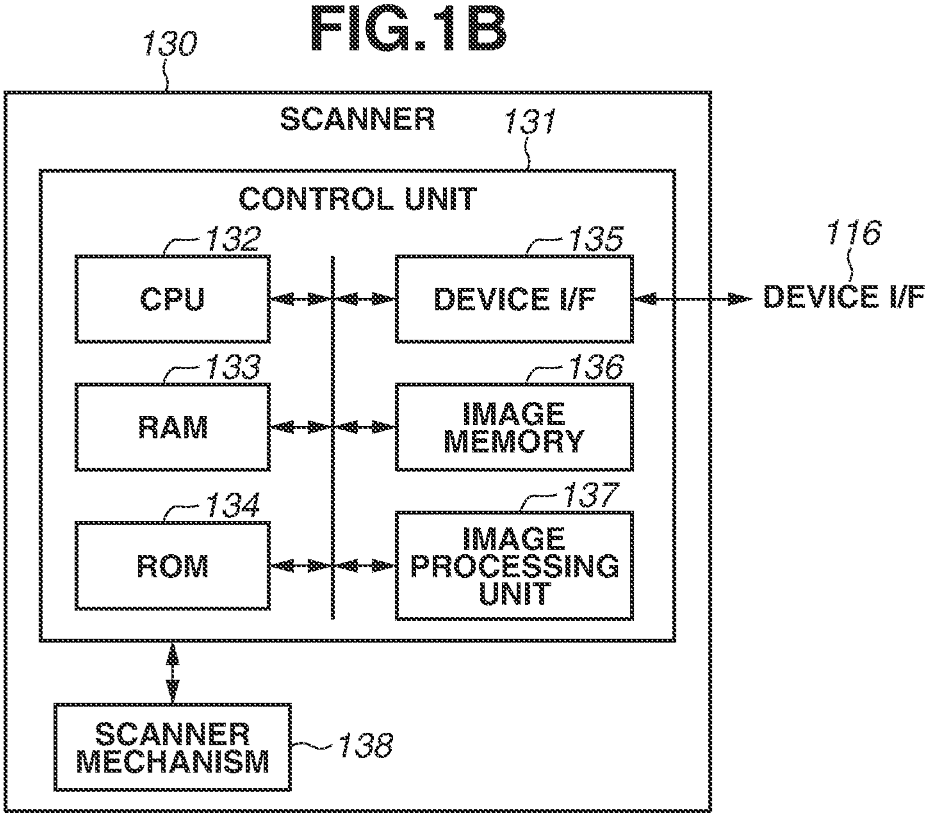
FIG. 1B is a block diagram illustrating a configuration of a scanner.
Figure 2:
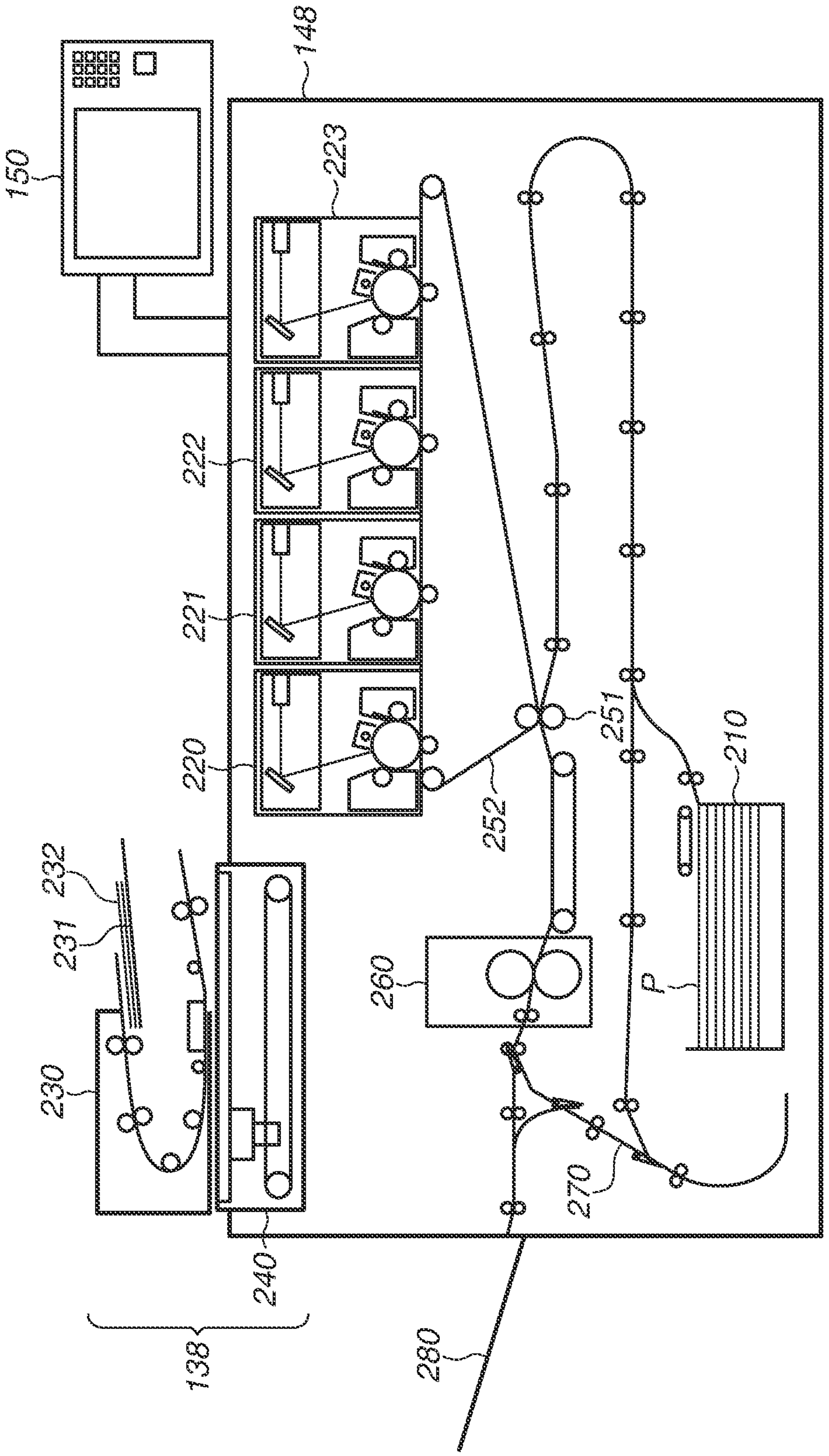
FIG. 2 is a mechanical sectional view illustrating a structure of the MFP.

FIG. 1B is a block diagram illustrating the configuration of the scanner 130. FIG. 2 is a mechanical sectional view illustrating the structure of the image forming apparatus 100. The scanner 130 includes a control unit 131 and a scanner mechanism 138. The control unit 131 includes a CPU 132, a RAM 133, a ROM 134, a device I/F 135, an image memory 136, and an image processing unit 137.

The CPU 132 controls the operation of the scanner 130, and operates based on programs that are stored in the ROM 134 and are loaded into the RAM 133. The device I/F 135 is connected to the control unit 110, and performs image data synchronous/asynchronous conversion. The image memory 136 is a memory into which image data input from the scanner mechanism 138 is temporarily loaded. The control unit 131 transmits image data stored in the image memory 136 to the control unit 110 based on an image transfer command received via the device I/F 135.

The image processing unit 137 performs image processing on the image data loaded into the image memory 136.

The scanner mechanism 138 includes a pressure platen 240 to read a document placed on a platen glass, and an auto document feeder (ADF) unit 230 that conveys a document 232 placed on a platen glass 231 and reads the document 232. In the ADF unit 230, the document 232 placed on the platen glass 231 is conveyed by conveyance rollers and image reading is performed by an image sensor such as a contact image sensor (CIS).

<Printer>

Figure 1C:
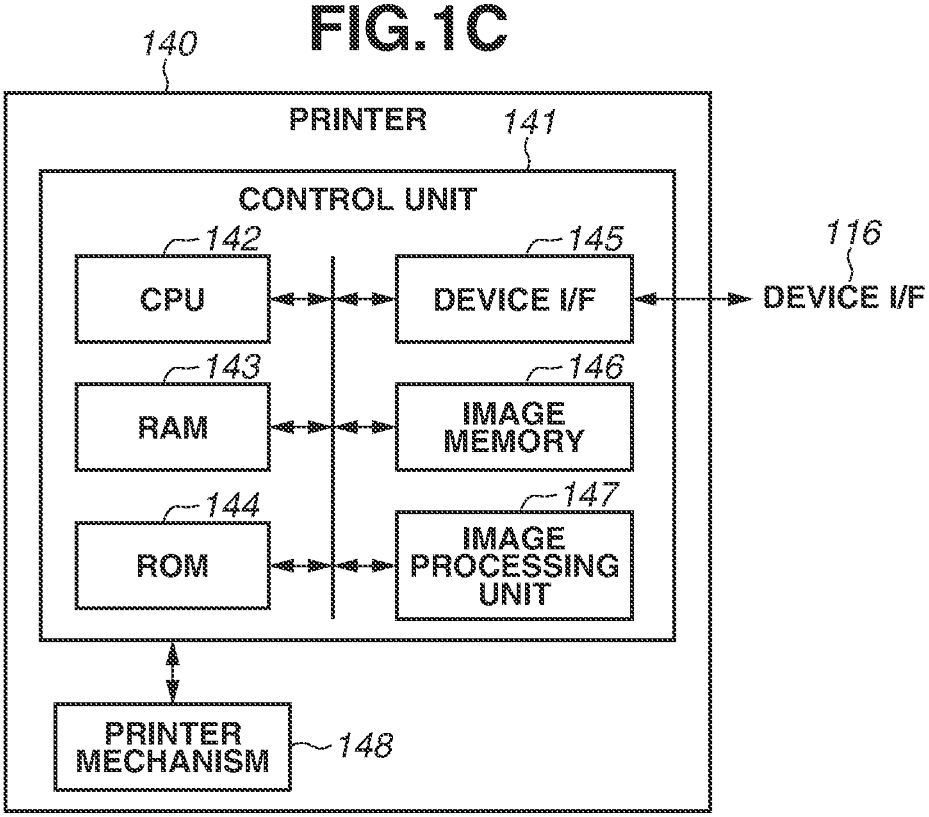
FIG. 1C is a block diagram illustrating a configuration of a printer.

FIG. 1C is a block diagram illustrating the configuration of the printer 140. The printer 140 includes a control unit 141 and a printer mechanism 148. The control unit 141 includes a CPU 142, a RAM 143, a ROM 144, a device I/F 145, an image memory 146, and an image processing unit 147.

The CPU 142 controls the operation of the printer 140, and operates based on programs that are stored in the ROM 144 and are loaded into the RAM 143. The device I/F 145 is connected to the control unit 110, and performs image data synchronous/asynchronous conversion. The image memory 146 is a memory into which image data input from the control unit 110 is temporarily loaded. The control unit 141 controls the printer mechanism 148 based on a command received via the device I/F 145.

The printer mechanism 148 is a mechanical mechanism for performing electrophotographic image forming processing. The printer mechanism 148 includes an engine control unit that performs control for each printing process process (e.g., feed process), and a control board accommodation unit that accommodates a printer controller.

Examples of mechanisms constituting an engine unit include an optical processing mechanism to form a latent image and a developed image, a transfer processing mechanism to transfer an image onto a sheet P, a fixation processing mechanism to fix a toner image transferred onto the sheet P, a feed processing mechanism to feed the sheet P, and a conveyance processing mechanism to convey the sheet P.

During formation of a color image, a yellow (Y) station 220, a magenta (M) station 221, a cyan (C) station 222, and a black (K) station 223 are used as the optical processing mechanism. Toner images developed on each station are sequentially transferred onto the surface of an intermediate transfer member 252, thereby forming a full-color visible image on the surface of the intermediate transfer member 252 (primary transfer).

Next, the sheet P that is fed from a sheet storage 210 is conveyed and brought into pressure contact with the intermediate transfer member 252 by transfer rollers 251. At the same time, bias having a polarity opposite to that of toner is applied to the transfer rollers 251. As a result, the visible image formed on the surface of the intermediate transfer member 252 is transferred onto the sheet P that is conveyed synchronously in a conveyance direction (sub-scanning direction) of the sheet P by the feed processing mechanism (secondary transfer).

The sheet P that has undergone the secondary transfer process passes through a fixing unit 260, so that the toner image transferred onto the sheet P is heated and melted and is then fixed as an image onto the sheet P. In double-sided printing, the sheet P passes through a reversing unit 270 and is reversed by switching back, and is introduced into a transfer unit again to transfer the image onto the back surface of the sheet P. After that, the sheet P passes through the fixing unit 206, so that the toner image formed on the sheet P is heated and fixed in the same manner as described above, and then the sheet P is discharged onto a discharge unit 280. Thus, the printing process is completed.

<Image Position Adjustment>

A method for acquiring an adjustment value for an image position using an adjustment chart will be described in detail.

FIG. 8A illustrates the front surface of an adjustment chart. FIG. 8B illustrates the back surface of the adjustment chart. FIG. 8C illustrates each measurement area on the adjustment chart. FIG. 8D illustrates specific examples of the measurement area.

FIG. 10A illustrates a relationship among a measured value, an ideal value, and an adjustment value. FIG. 10B illustrates specific examples of the adjustment value.

A chart of a format in which marks for image position adjustment are printed on a sheet as illustrated in FIG. 8A is described by way of example.

A chart 800 includes markers 801 and an identification patch 802 as an image of a predetermined pattern. A chart 803 includes the markers 801 and an identification patch 804.

The markers 801 are images used to measure the image forming position on the sheet and are formed near four corners of the sheet.

The identification patches 802 and 804 are images used to identify the front and back surfaces of the chart and the orientation of the chart.

Areas indicated by distances (A) to (J) illustrated in FIG. 8C are measured using this chart. The distance (A) corresponds to the length of the chart in a main-scanning direction, and the distance (B) corresponds to the length of the chart in the sub-scanning direction. The sheet lengths defined in the sheet library are ideal lengths.

The front and back surfaces of the chart and the direction of the placement of the chart are determined depending on the position and orientation of each of the identification patches 802 and 804. For example, if the image of the identification patch 802 is detected in identification patch sampling processing, it is determined that the surface on which the image is detected corresponds to the front surface of the chart. If the image of the identification patch 804 is detected in identification patch sampling processing, it is determined that the surface on which the image is detected corresponds to the back surface of the chart. In this case, if the identification patch 802 or the identification patch 804 is located in an upper right area, it is determined that the chart is properly placed. On the other hand, if the identification patch 802 or the identification patch 804 is located in a lower left area, it is determined that the chart is placed in the opposite orientation.

The distances (C) to (J) are distances from the corner of the corresponding marker 801 to the nearest sheet edge as illustrated in FIG. 8C. The measured distances illustrated in FIG. 8D are set as measured values in a table and are stored in the RAM 112. The measured values are used to calculate the adjustment value.

An item 1411 indicates a formula to handle the measured value. An item 1412 indicates an ideal value, and an item 1413 indicates how to calculate the adjustment value. The calculated adjustment values are stored as an adjustment value set 1420 in the storage unit 114 as illustrated in FIG. 10B. The adjustment value set 1420 includes a front surface adjustment value 1422 and a back surface adjustment value 1423. The front surface adjustment value 1422 and the back surface adjustment value 1423 are independently set.

Figure 5:
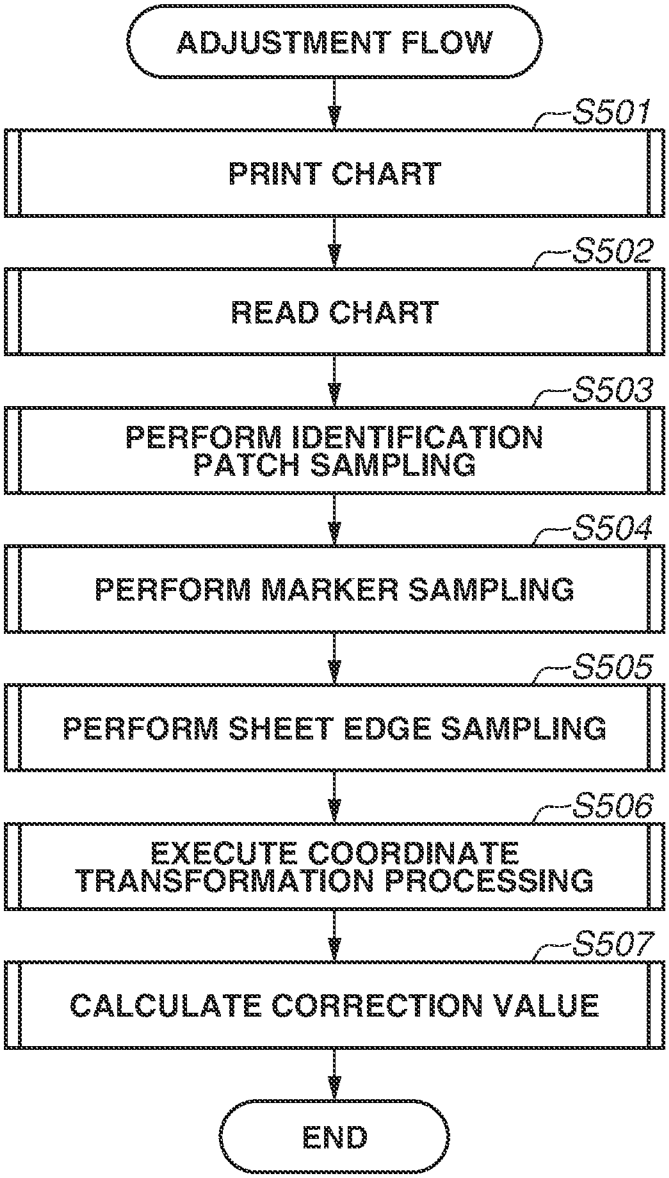
FIG. 5 is a flowchart illustrating image position adjustment processing.

To acquire the above-described adjustment values, the MFP 100 according to the present exemplary embodiment executes a series of processes for an adjustment function. FIG. 5 is a flowchart illustrating image position adjustment processing.

In step S501, the CPU 111 executes chart print processing.

Figure 4A:
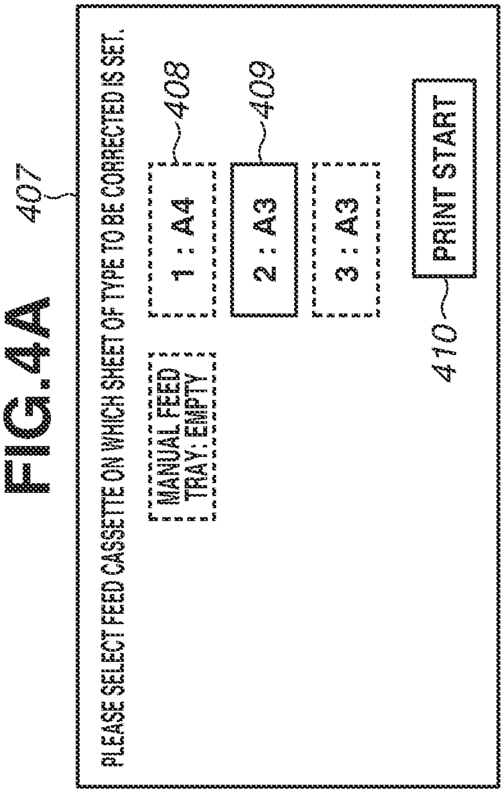
FIG. 4A illustrates a chart print screen.

In a process of chart print processing, the CPU 111 causes the operation unit 150 to display an image position adjustment screen 407. As illustrated in FIG. 4A, the image position adjustment screen 407 includes a print start button 410 and a plurality of pieces of cassette information including cassette information 408 and cassette information 409. In this case, the cassette information 408 indicates an example of cassette information on which the image position adjustment processing cannot be started, for example, due to out of paper. The cassette information 409 indicates an example of cassette information on which the image position adjustment processing cannot be started. Thus, it may be desirable to display the cassette information differently based on whether conditions on which the image position adjustment processing can be started are satisfied. The user designates cassette information on which the image position adjustment processing is performed from the plurality of pieces of cassette information, and selects the print start button 410. The CPU 111 that has received this instruction causes the printer 140 to execute image forming processing based on the image of the chart on a predetermined number of sheets. As a result, the predetermined number of charts as illustrated in FIGS. 8A and 8B are output from the discharge unit 280. The number of charts to be output when image position adjustment processing is performed once can be changed according to an instruction from the user.

Figure 4B:
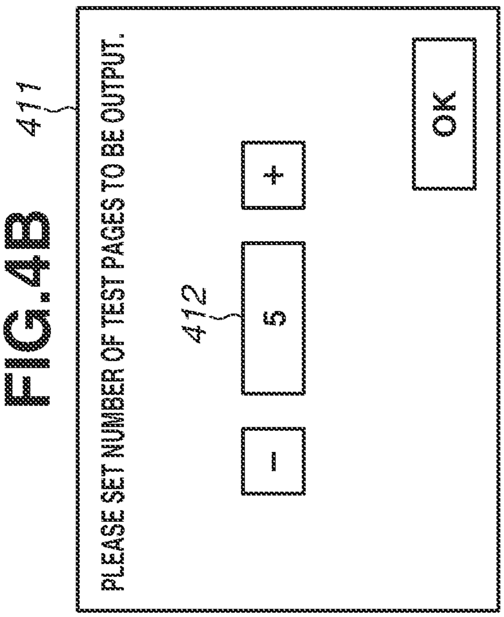
FIG. 4B illustrates a chart print setting screen.

For example, as illustrated in FIG. 4B, the CPU 111 causes the operation unit 150 to display a screen 411 to set the number of sheets to be output. The screen 411 to set the number of sheets to be output includes an input form 412 to input a setting value for setting the number of sheets to be output, and an OK button. When the number of sheets to be output is input in the input form 412 and then the OK button is selected, the CPU 111 stores the number set in the input form 412 in the RAM 112. This information is used when the print start button 410 is selected.

In step S502, the CPU 111 executes chart reading processing.

Figure 4C:
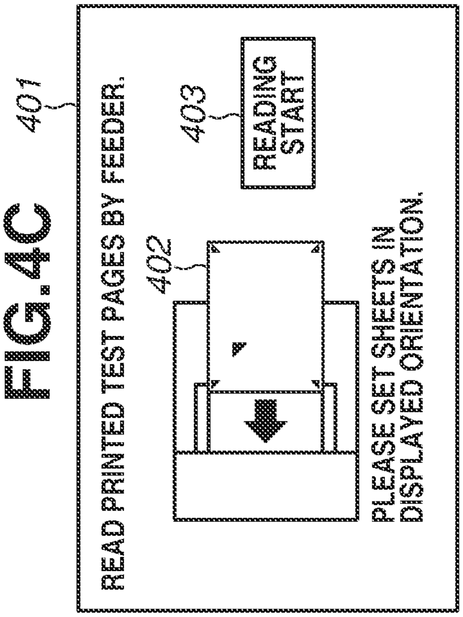
FIG. 4C illustrates a chart reading screen.

In a process of chart print processing, the CPU 111 causes the operation unit 150 to display a chart reading screen 401. As illustrated in FIG. 4C, the chart reading screen 401 includes guidance information 402 indicating a chart reading orientation, and a reading start button 403. When the reading start button 403 is selected in a state where the chart is set on the platen glass 231, the CPU 111 starts reading processing. A screen 404 illustrated in FIG. 4F may be displayed in place of the chart reading screen 401 illustrated in FIG. 4C. The screen 404 has a configuration in which a guidance 405 is additionally displayed on the screen illustrated in FIG. 4C.

In step S503, the CPU 111 executes identification patch sampling processing.

In the identification patch sampling processing, processing for identifying the front and back surfaces of the chart and the orientation of the chart is performed.

In step S504, the CPU 111 executes marker sampling processing.

In the marker sampling processing, processing for measuring a chart image forming position is performed.

In step S505, the CPU 111 executes sheet edge sampling processing.

In the sheet edge sampling processing, processing for detecting sheet edge positions, in particular, sheet corner positions is performed. Examples of the method for detecting sheet edges include a method of detecting a shadow of each sheet edge and a method of detecting a difference in color between a sheet and an area outside the sheet. Descriptions of these known techniques are omitted in the present exemplary embodiment.

In step S506, the CPU 111 executes coordinate transformation processing.

In the coordinate transformation processing, the measured values of the distances illustrated in FIGS. 8C and 8D are calculated based on marker coordinate information obtained in step S504 and sheet edge coordinate information obtained in step S505. To calculate the measured values, coordinate information correction processing is performed as needed. For example, if the chart reading orientation is incorrect, coordinate rotation processing is performed and then the processing proceeds to the subsequent step.

In step S507, the CPU 111 executes correction value calculation processing.

In step S507, the CPU 111 calculates the correction value (adjustment value) based on the information obtained in the previous processing. After the correction value calculation processing is normally completed, the CPU 111 causes the operation unit 150 to display a screen 413 illustrated in FIG. 4E. The screen 413 displays information indicating that the correction processing is completed. FIG. 4E illustrates a completion screen. If rotation processing is performed in the coordinate transformation processing, the CPU 111 may cause the operation unit 150 to display a screen 414 illustrated in FIG. 4G. The screen 414 displays information indicating that the correction processing is completed and the rotation processing has been performed.

<Marker Sampling Processing>

Figure 7:
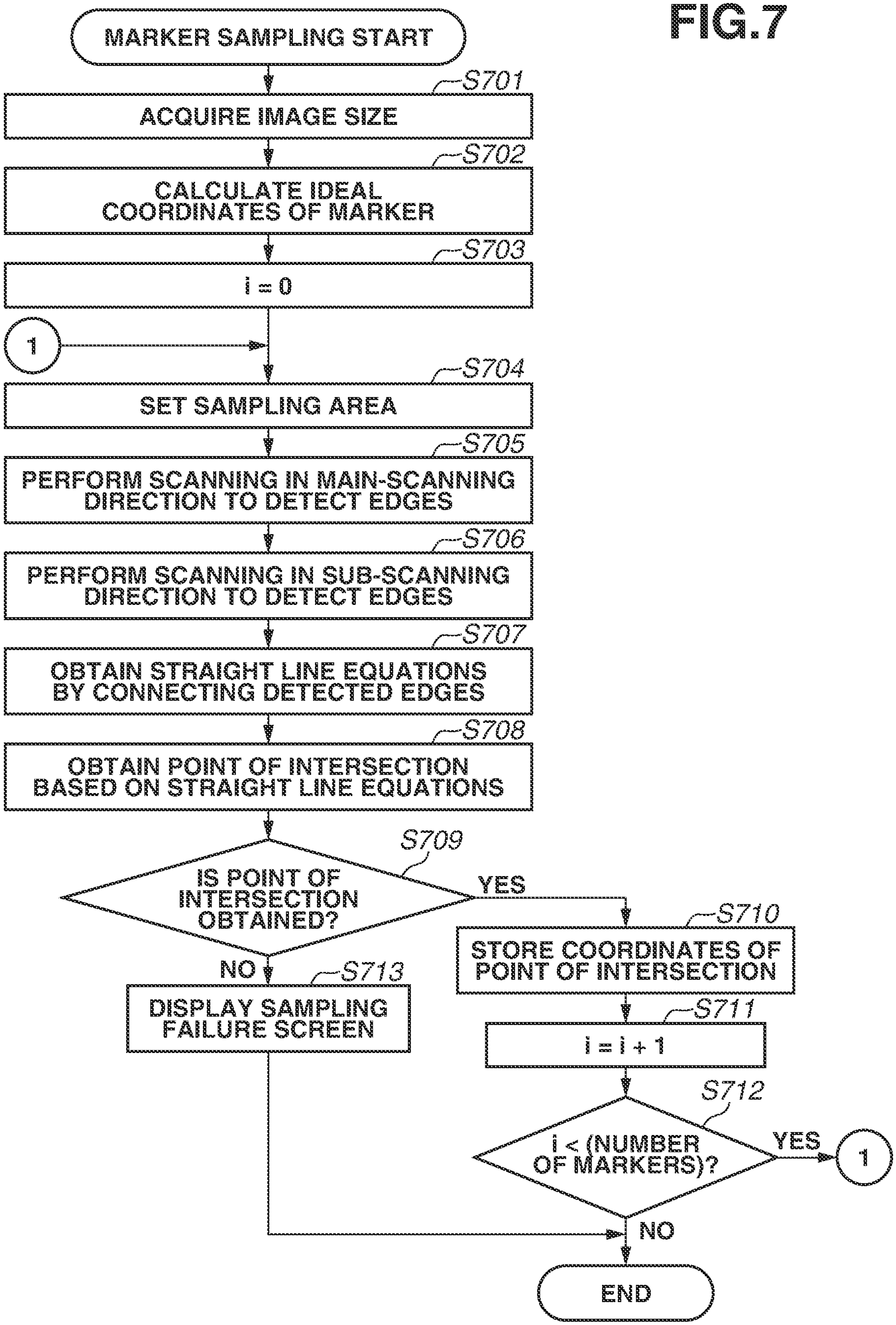
FIG. 7 is a flowchart illustrating marker sampling processing.

The marker sampling processing will now be described. FIG. 7 is a flowchart illustrating the marker sampling processing.

In step S701, the CPU 111 acquires the size of an image scanned by the scanner 130.

In step S702, the CPU 111 calculates ideal coordinates of each marker based on the acquired image size and an index value.

In step S703, the CPU 111 initializes the index.

Figure 9A:
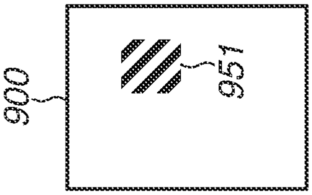
FIG. 9A illustrates an identification patch sampling area.
Figure 9B:
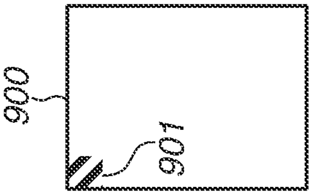
FIG. 9B illustrates a marker sampling area.

In step S704, the CPU 111 sets each sampling area based on the acquired image size. An area 901 illustrated in FIG. 9B indicates an area obtained when the index is "0" in step S704. FIG. 9B illustrates a sampling area in the marker sampling processing. When the index is "0", the square sampling area 901 has one side of 1000 pixels and is located at the upper left edge of a reading chart 900.

Figure 9C:
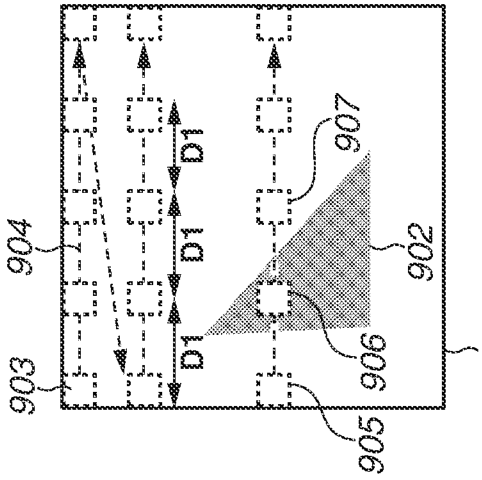
FIG. 9C illustrates an adjustment chart measurement area.

In step S705, the CPU 111 performs scanning in the main-scanning direction to detect edges. FIG. 9C schematically illustrates a state of sampling processing in step S705. FIG. 9C illustrates a state where a marker 902 is included in the sampling area 901.

A pixel 903 corresponding to a start address is an address pixel determined in step S704. The CPU 111 refers to pixel values at predetermined intervals D1 in a direction indicated by arrows 904 from the address. The pixel 903 and pixels 905, 906, and 907 are some of the pixels to be referenced. The interval D1 corresponds to, for example, 10 pixels.

The CPU 111 calculates the difference between the pixel values of the referenced pixels. If the difference is more than or equal to a predetermined threshold, it is determined that there is an edge in the interval on the image. For example, the CPU 111 determines that there is an edge in the interval between the pixels 905 and 906 and there is an edge in the interval between the pixels 906 and 907.

Figure 9D:
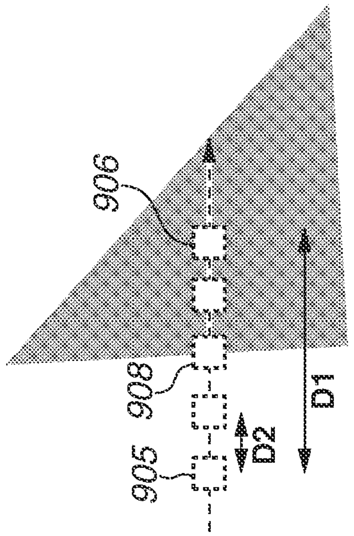
FIG. 9D illustrates a specific example of each measurement area, FIG. 9E schematically illustrates a state of sampling processing, and FIG. 9F schematically illustrates an example of calculating coordinates for adjustment.

Further, the CPU 111 performs detailed sampling processing as illustrated in FIG. 9D on the interval in which it is determined that there is an edge. The CPU 111 refers to pixel values at intervals D2 (D2<D1) in the detailed sampling processing on the interval between the pixels 905 and 906. The interval D2 corresponds to, for example, one pixel. As a result, it is determined that a pixel 908 corresponds to an edge. The CPU 111 stores the coordinates of the pixel 908 in the RAM 112.

In step S706, the CPU 111 performs scanning in the sub-scanning direction to detect edges.

Figure 9E:
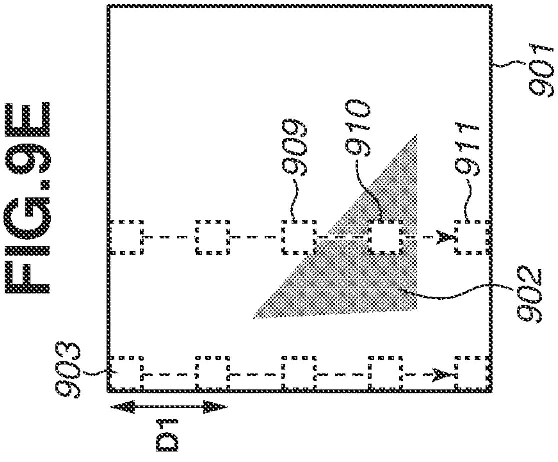

The CPU 111 performs processing similar to step S705 in the changed direction. FIG. 9E schematically illustrates a state of sampling processing in step S706. For example, the CPU 111 determines that there is an edge in the interval between a pixel 909 and a pixel 910 and there is an edge in the interval between the pixel 910 and a pixel 911. The CPU 111 further performs sampling processing at the intervals D2 to detect edges, and stores the coordinates of the pixels in the RAM 112.

In step S707, the CPU 111 obtains a straight line equation by connecting a plurality of edges detected by an operation in the main-scanning direction, and also obtains a straight line equation by connecting a plurality of edges detected by scanning in the sub-scanning direction.

Figure 9F:
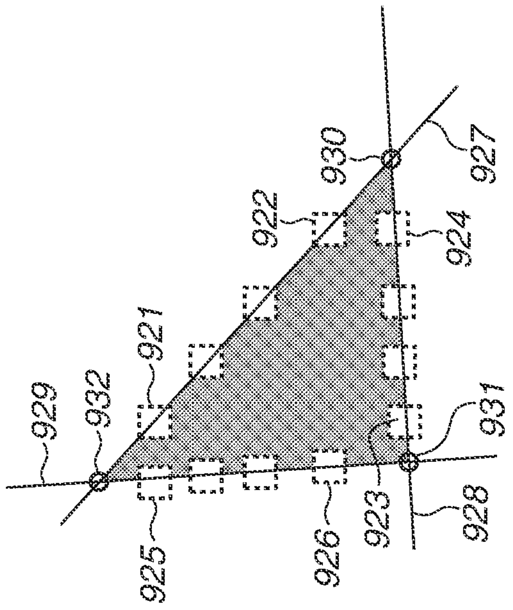

In step S708, the CPU 111 obtains a point of intersection based on a plurality of straight line equations. FIG. 9F schematically illustrates an example where the CPU 111 calculates coordinates for adjustment by obtaining the straight line equations and the point of intersection in steps S707 and S708, respectively, based on the obtained coordinates as described above. The CPU 111 obtains each straight line that passes through two farthest points among the obtained coordinates. In the example illustrated in FIG. 9F, a straight line 927 that passes through an edge 921 and an edge 922, a straight line 928 that passes through an edge 923 and an edge 924, and a straight line 929 that passes through an edge 925 and an edge 926 are obtained.

Next, the CPU 111 calculates point-of-intersection coordinates 930, 931, and 932 based on the straight lines 927, 928, and 929.

In step S710, the CPU 111 stores the point-of-intersection coordinates in the RAM 112.

In step S709, the CPU 111 determines whether the point of intersection is obtained. If the point of intersection is obtained (YES in step S709), the processing proceeds to step S710. If the point of intersection is not obtained (NO in step S709), the processing proceeds to step S713.

In step S710, the CPU 111 performs processing for storing the coordinates of the point of intersection.

In step S711, the CPU 111 increments the index.

In step S712, the CPU 111 compares the index with the number of markers. If the index is less than the number of markers (YES in step S712), the processing returns to step S704. If the index is more than or equal to the number of markers (NO in step S712), the CPU 111 terminates the series of processes.

Figure 4D:
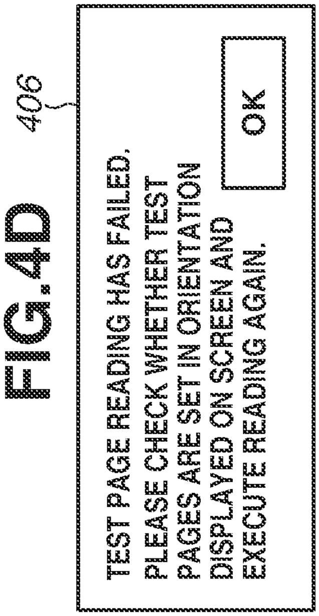
FIG. 4D illustrates an error screen.
Figure 4E:
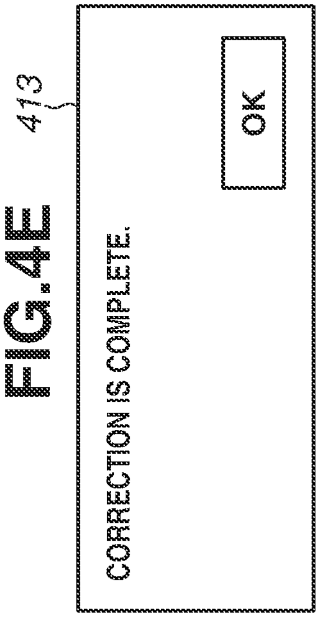
FIG. 4E illustrates a completion screen.
Figure 4F:
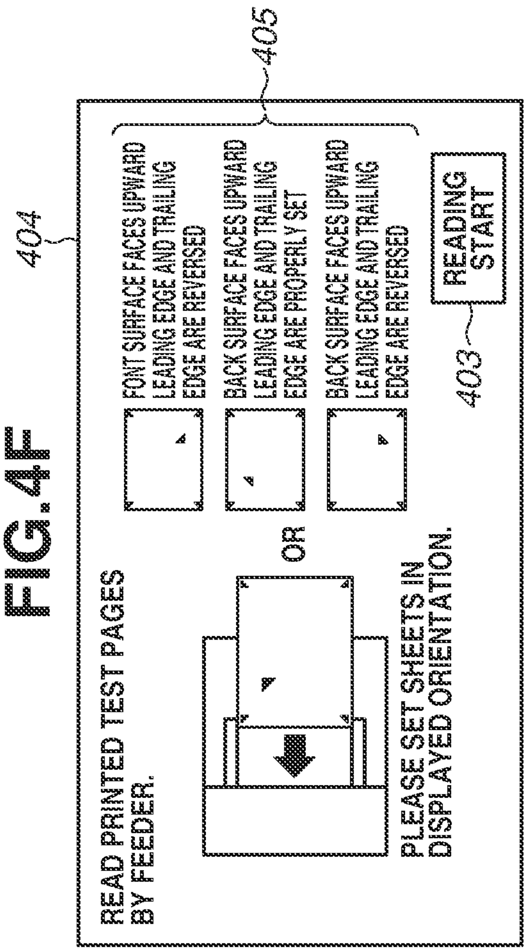
FIG. 4F illustrates a modified example of the completion screen.
Figure 4G:
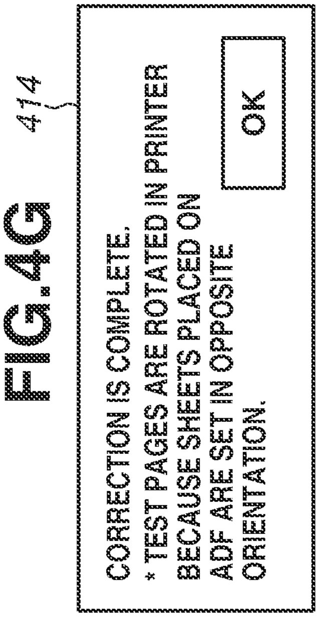
FIG. 4G illustrates another modified example of the completion screen.

In step S713, the CPU 111 causes the operation unit 150 to display a sampling failure screen 406 illustrated in FIG. 4D. FIG. 4D illustrates an error screen.

The marker 902 according to the present exemplary embodiment is formed to include the straight line 927 that has an angle (e.g., 45 degrees) and is not parallel to the short-side direction and the long-side direction of the sheet. This makes it possible to prevent false recognition due to a reading stripe pattern generated during conveyance of the sheet. It may be desirable that the straight line 927 has a sufficient angle with respect to each of the short-side direction and the long-side direction of the sheet. Accordingly, it may be desirable that the angle of the straight line 927 from the short side and the long side of the sheet falls within a range of about 35 to 55 degrees.

The marker 902 according to the present exemplary embodiment is an area that has a triangular shape (isosceles triangle shape) having the sides corresponding to the straight lines 927, 928, and 929, and is filled with pixels located on the inside of the sides of the marker 902. This configuration prevents false recognition due to image contamination caused by the presence of hair or the like on the chart. Even in the case of referring to the pixel values, for example, at the intervals D1, markers can be easily detected. Therefore, marker detection processing can be rapidly performed. It may be desirable to form the identification patches 802 and 804 as filled-in areas each having sides. To distinguish the identification patches 802 and 804 from the markers 801, it may be desirable that the size or the like of the identification patches 802 and 804 may be different from that of the markers 801.

<Identification Patch Sampling Processing>

Figure 6:
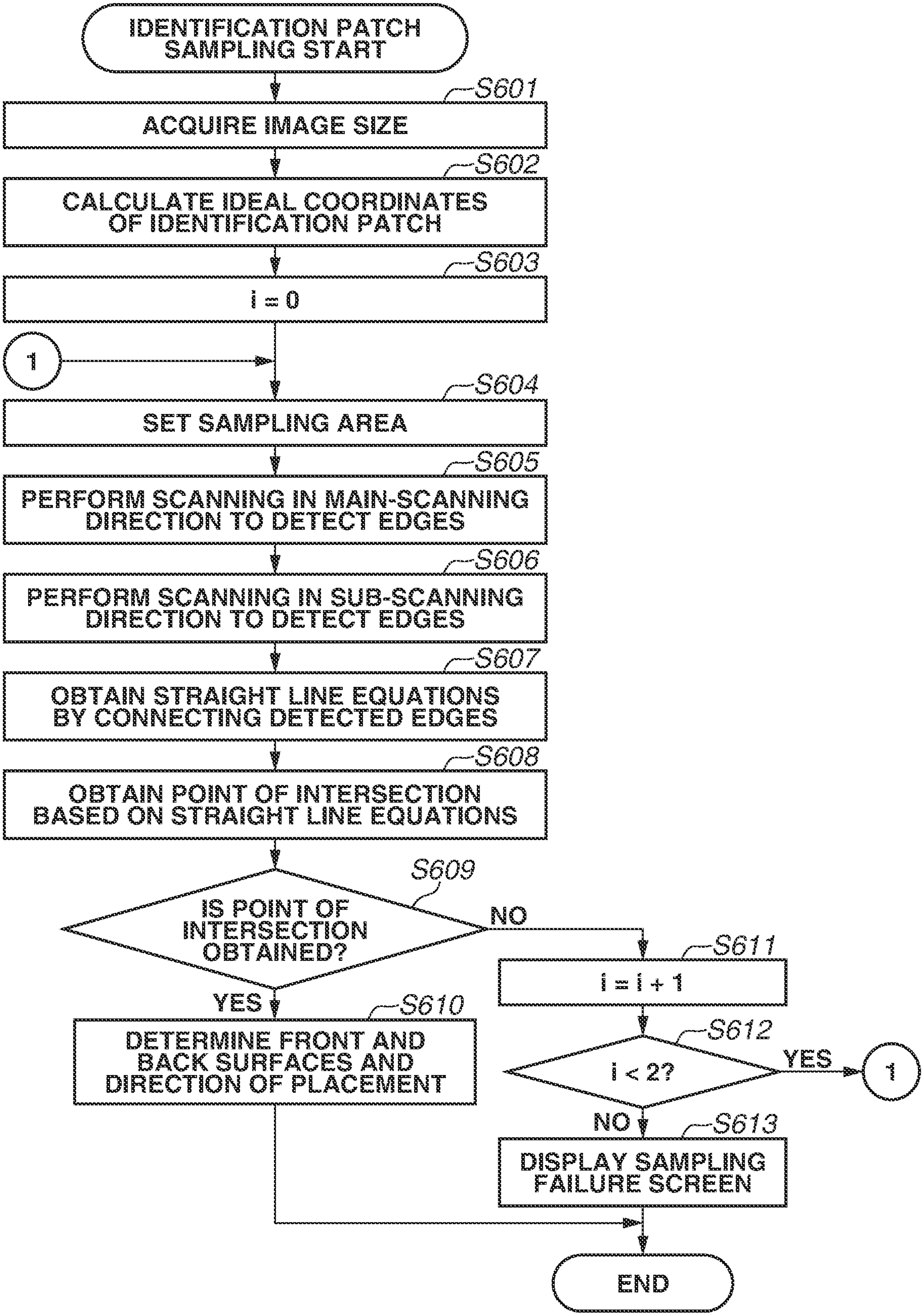
FIG. 6 is a flowchart illustrating identification patch sampling processing.

The identification patch sampling processing will now be described. FIG. 6 is a flowchart illustrating the identification patch sampling processing. In step S601, the CPU 111 acquires the size of an image scanned by the scanner 130.

In step S602, the CPU 111 calculates ideal coordinates of the identification patch based on the acquired image size.

In step S603, the CPU 111 initializes the index.

In step S604, the CPU 111 sets each sampling area based on the acquired image size and an index value. FIG. 9A illustrates a sampling area in the identification patch sampling processing. When the index is "0", sampling processing is performed on a sampling area 951 that is located in an upper right area and is closer to the center of the reading chart 900. In the present exemplary embodiment, the sampling area 951 is a square area having 2000 pixels on each side and having a central point at a location corresponding to the three-fourths of the image size in the main-scanning direction and corresponding to the one-fourth of the image size in the sub-scanning direction.

In step S605, the CPU 111 performs scanning in the main-scanning direction to detect edges. In this case, processing similar to the processing illustrated in FIGS. 9C and 9D is performed.

In step S606, the CPU 111 performs scanning in the sub-scanning direction to detect edges.

In this case, processing similar to the processing illustrated in FIG. 9E is performed.

In step S607, the CPU 111 obtains a straight line equation by connecting a plurality of edges detected by an operation in the main-scanning direction, and also obtains a straight line equation by connecting a plurality of edges detected by scanning in the sub-scanning direction.

In step S608, the CPU 111 obtains a point of intersection based on a plurality of straight line equations. In this case, processing similar to the processing illustrated in FIG. 9F is performed.

In step S609, the CPU 111 determines whether the point of intersection is obtained. If the point of intersection is obtained (YES in step S609), the processing proceeds to step S610. If the point of intersection is not obtained (NO in step S609), the processing proceeds to step S611.

In step S610, the CPU 111 determines the front and back surfaces and the direction of the placement.

In step S611, the CPU 111 increments the index.

In step S612, the CPU 111 determines whether the index is less than "2". If the index is less than "2" (YES in step S612), the processing returns to step S604.

If the index is more than or equal to "2" (NO in step S612), the processing proceeds to step S613.

In step S613, the CPU 111 causes the operation unit 150 to display the sampling failure screen 406.

<Remarks>

By the above-described procedure, the image position adjustment processing can be performed in a state where the processing is hardly affected by a stripe-like pattern on the read image caused due to the presence of dust on the reading unit that is inherent in the ADF. Further, the top and bottom and the front and back surfaces of the read image can be determined and appropriate correction processing can be performed, thereby enabling the user to use this function without being aware of properly placing a document.

The first exemplary embodiment described above illustrates the configuration in which the identification patch sampling processing and the marker sampling processing are performed in different processes. In the case of forming an image of each identification patch separately from marks for adjustment to determine the front and back surfaces of a sheet and the orientation of the sheet, it may be preferable to prevent false detection of this identification patch. Even when the marks for adjustment and the identification patches are mixed on one sheet, it may be desirable to appropriately detect the markers for adjustment and the identification patch. A second exemplary embodiment is directed to providing an image forming apparatus capable of appropriately detecting markers for adjustment and an identification patch in a configuration using an adjustment chart on which the markers for adjustment and the identification patch for identifying the front and back surfaces and the orientation of the sheet are mixed. The second exemplary embodiment illustrates a configuration in which the identification patch sampling processing and the marker sampling processing are performed at once. The second exemplary embodiment is similar to the first exemplary embodiment, except for the characteristic portions. Accordingly, the same components are denoted by the same reference numerals, and the detailed descriptions thereof are omitted.

Figure 11:
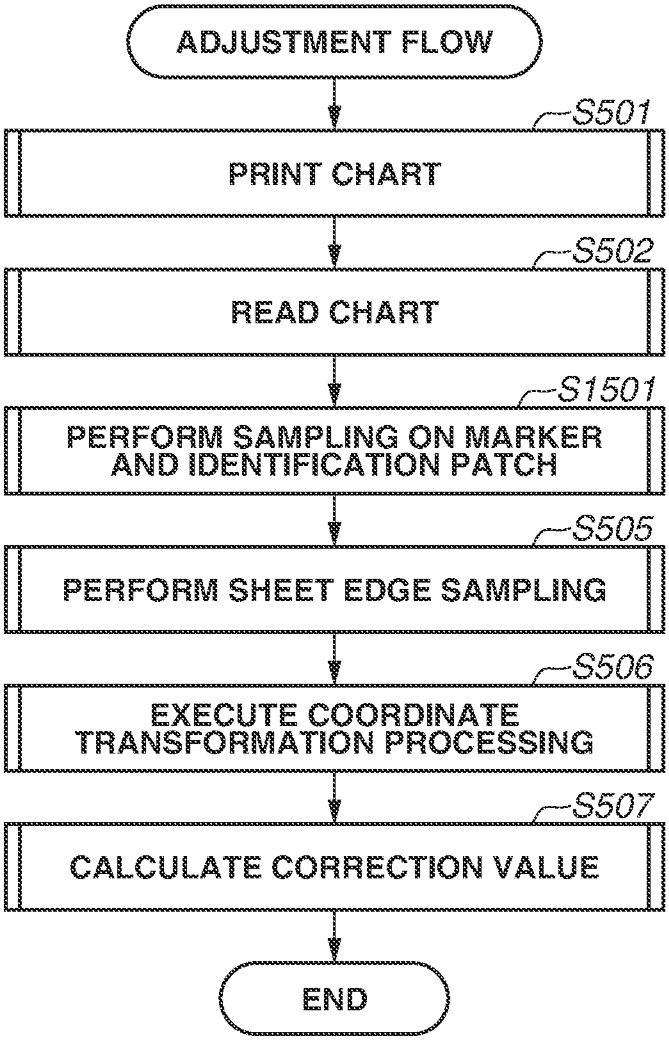
FIG. 11 is a flowchart illustrating image position adjustment processing.

FIG. 11 is a flowchart illustrating image position adjustment processing according to the second exemplary embodiment. The image position adjustment processing flow differs from the processing flow of the entire adjustment function according to the first exemplary embodiment illustrated in FIG. 5 in that the identification patch sampling processing performed in step S503 and the marker sampling processing performed in step S504 in the first exemplary embodiment are performed at once in step S1501.

<Marker and Identification Patch Sampling Processing>

Figure 12:
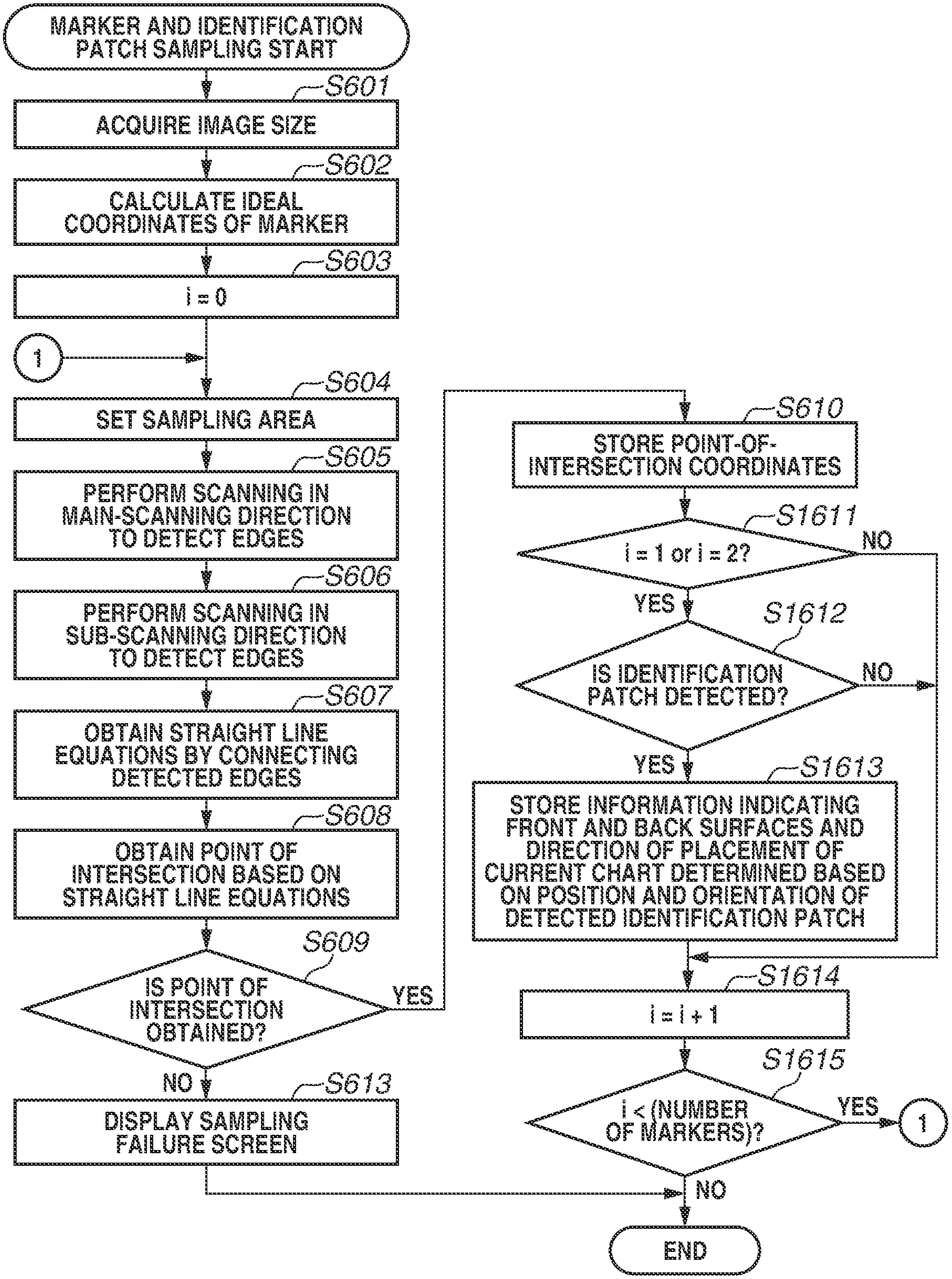
FIG. 12 is a flowchart illustrating identification patch sampling processing and marker sampling processing.

FIG. 12 is a flowchart illustrating identification patch sampling processing and marker sampling processing. Steps S601 to S610 and step S613 are identical to those in the flowchart illustrated in FIGS. 6 and 7 in the first exemplary embodiment, and thus the description thereof is omitted. Processing of step S1611 and subsequent steps will be described below.

If the determination result in step S1611 indicates "YES" and the determination result in step S1612 indicates "YES", the processing proceeds to step S1613. If the determination result in step S1611 indicates "NO" or the determination result in step S1612 indicates "NO", the processing proceeds to step S1614.

In step S1613, the CPU 111 determines the front and back surfaces and the direction of the placement of the chart on which the sampling processing is currently performed based on the position and orientation of the detected identification patch, and stores the determination result.

In step S1614, the CPU 111 increments the index. In step S1615, the CPU 111 compares the index with the number of markers.

If the determination result in step S1615 indicates "YES", the processing returns to step S604.

If the determination result in step S1615 indicates "NO", the CPU 111 terminates the processing.

Figure 13A:
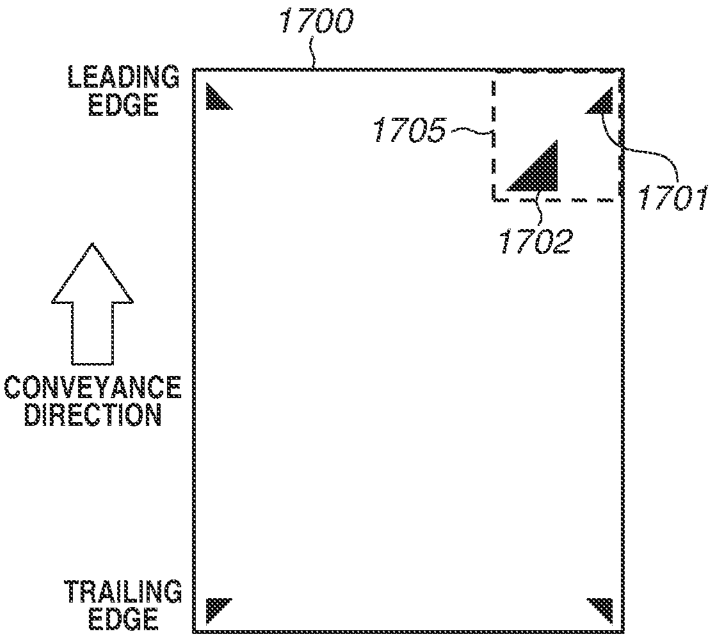
FIG. 13A illustrates the front surface of a correction chart.
Figure 13B:
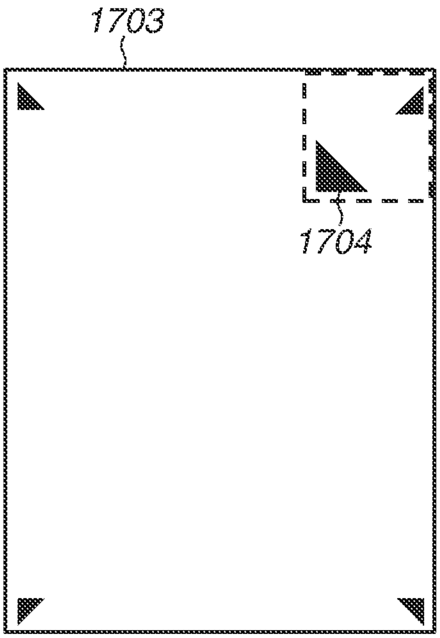
FIG. 13B illustrates the back surface of the correction chart.

FIG. 13A illustrates the front surface of a correction chart. FIG. 13B illustrates the back surface of the correction chart. The present exemplary embodiment illustrates an example where four markers are used.

A filled-in isosceles right triangle area having the same shape as each marker is used as an identification patch, and the identification patch is located on each of the front surface and the back surface of the chart. The identification patch is located within a sampling area of a specific marker on both of the front surface and the back surface, and is located on the inner side of the sheet than the marker. In the present exemplary embodiment, identification patches 1702 and 1704 are located within a sampling area 1705 of a marker 1701, and are located on the inner side of the sheet than the marker 1701, or on the lower side of the lower edge of the marker 1701 and on the left side of the left edge of the marker 1701. Any marker may be set as the specific marker as long as the marker is present at the same position when the chart is rotated by 180 degrees, and the position of the marker is not limited to the position illustrated in FIGS. 13A and 13B.

The orientation of each identification patch is set as follows. That is, the equal sides of each identification patch are parallel to the sheet edges. The identification patch 1702 on the front surface is set in the orientation in which the right-angle portion of the isosceles right triangle is located in a lower left area, and the identification patch 1704 on the back surface is set in the orientation in which the right-angle portion of the isosceles right triangle is located in a lower right area.

In the second exemplary embodiment, each identification patch is detected in a sampling area that is the same as that for the marker, thereby making it possible to determine whether each edge detected based on the layout position corresponds to the identification patch or the marker.

Figure 14:
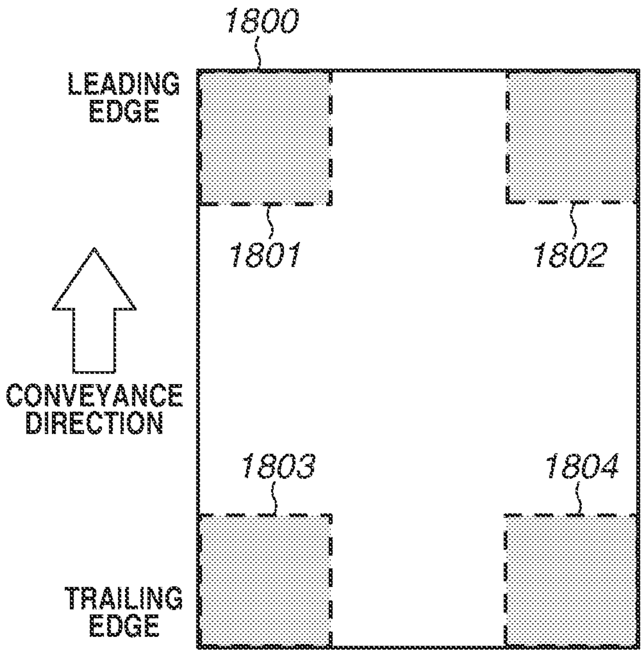
FIG. 14 illustrates areas on which identification patch sampling processing and marker sampling processing are performed.

FIG. 14 illustrates each area on which identification patch sampling processing and marker sampling processing are performed.

In the second exemplary embodiment, the sampling processing is performed in step S1501.

As described above in the first exemplary embodiment, in step S604, the CPU 111 determines each area on which the sampling processing is to be performed depending on the value of the index. An area 1801 is a sampling area on the read chart image when the index is “0”. An area 1802 is a sampling area when the index is “1”. An area 1803 is a sampling area when the index is “2”. An area 1804 is a sampling area when the index is “3”. In this case, the area 1801 is a square area having 3000 pixels on each side and located at the upper left edge of the image. The area 1802 is a square area having 3000 pixels on each side and located at the upper right edge of the image. The area 1803 is a square area having 3000 pixels on each side and located at the lower left edge of the image. The area 1804 is a square area having 3000 pixels on each side and located at the lower right edge of the image. In this case, the identification patch is detected in the area 1802 or the area 1803 (YES in step S1611 and YES in step S1612). When the CPU 111 detects the identification patch in the area 1802 based on the layout position of the identification patch as described above, the CPU 111 determines that the chart is properly placed. When the CPU 111 detects the identification patch in the area 1803, the CPU 111 determines that the chart is placed in the opposite orientation. When the right-angle portion of the identification patch detected in the area 1802 is located in the lower left area, or when the right-angle portion of the identification patch detected in the area 1803 is located in the upper right area, the CPU 111 determines that the read chart image is formed on the front surface and the opposite side is the back surface. When the right-angle portion of the identification patch detected in the area 1802 is located in the lower right area, or when the right-angle portion of the identification patch detected in the area 1803 is located in the upper left area, the CPU 111 determines that the side on which the chart image is read corresponds to the back surface and the opposite side is the front surface. In step S1613, the CPU 111 stores information about the front and back surfaces of the chart and the direction of the placement determined based on the detected identification patch in the RAM 112.

<Remarks>

By the above-described procedure, according to the present exemplary embodiment, it is possible to obtain an appropriate correction result when the image position adjustment processing is performed by reading a sheet using an ADF, while reducing the number of times of sampling processing to be performed.

<Coordinate Transformation Processing>

The present exemplary embodiment is directed to providing an image forming apparatus capable of appropriately performing image position adjustment processing even when the orientation of a sheet placed by the user is different from a predetermined orientation.

Figure 15:
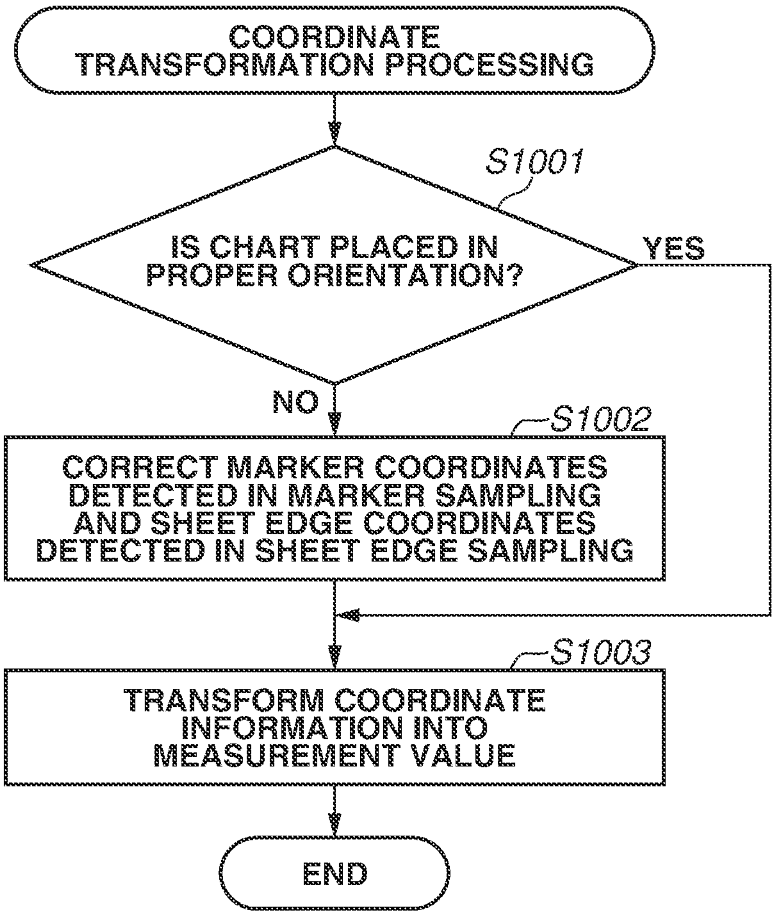
FIG. 15 is a flowchart illustrating coordinate transformation processing.

FIG. 15 is a flowchart illustrating processing for transforming the marker coordinates determined in step S504 and the sheet edge coordinates determined in step S505. Each distance based on a plurality of coordinates is transformed into a measured value based on each formula illustrated in FIG. 10A. If the chart that is placed in the opposite orientation is read, orientation correction processing is performed.

In step S1001, the CPU 111 checks the determination result in step S610 about whether the direction of the placement is correct. If the CPU 111 determines that the direction of the placement is incorrect (e.g., if the chart is placed in the opposite orientation) (NO in step S1001), the processing proceeds to step S1002. If the CPU 111 determines that the direction of the placement is correct (YES in step S1001), the processing proceeds to step S1003.

In step S1002, the CPU 111 transforms the marker coordinates determined in step S504 and the sheet edge coordinates determined in step S505 into coordinates in a state where the chart is properly placed, and stores the coordinates in the RAM 112.

Figure 16:
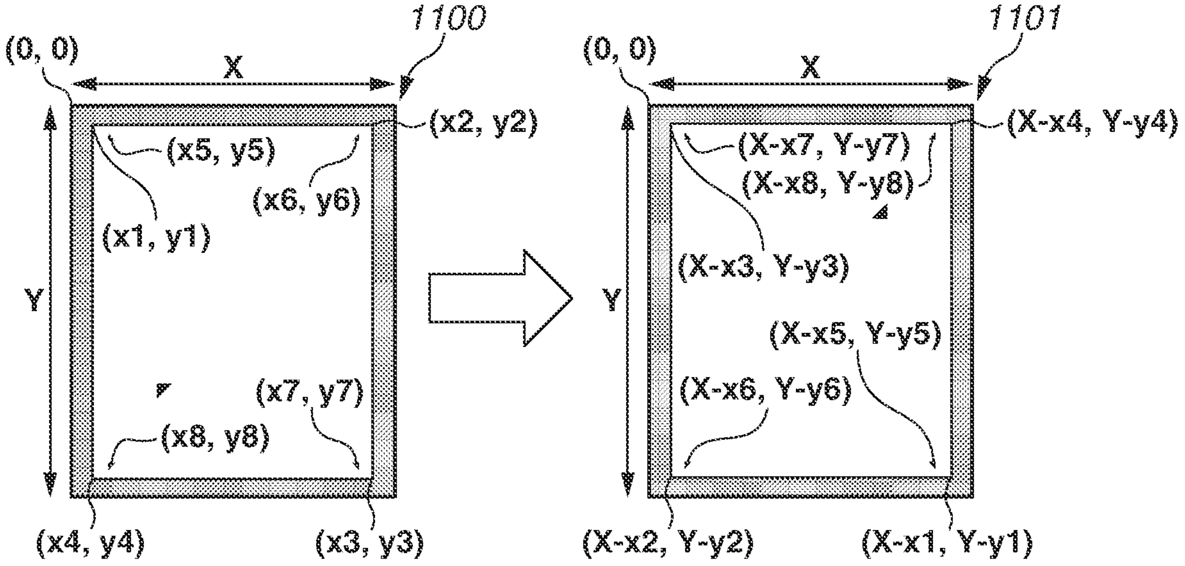
FIG. 16 illustrates coordinate maps before and after transformation in coordinate transformation processing.

FIG. 16 illustrates coordinate maps before and after coordinate transformation processing. The processing illustrated in FIG. 16 will be described with reference to an untransformed coordinate map 1100 and a transformed coordinate map 1101. On the untransformed coordinate map 1100 and the transformed coordinate map 1101, the width of a coordinate map image is represented by “X” and the height of the coordinate map image is represented by “Y”. On the untransformed coordinate map 1100, detected sheet edge coordinates (x1, y1) to (x4, y4) are set in order from the upper left area, the upper right area, the lower right area, and the lower left area of the image. On the untransformed coordinate map 1100, marker coordinates (x5, y5) to (x8, y8) are set in order from the upper left area, the upper right area, the lower right area, and the lower left area of the image. Processing for transforming the untransformed coordinate map 1100 into the transformed coordinate map 1101 is performed.

The coordinates corresponding to the coordinates obtained when sampling processing is performed in a state where the image is rotated by 180 degrees and is set in the proper orientation are set on the transformed coordinate map 1101. For example, the sheet edge upper left coordinates (x1, y1) are transformed into coordinates (X−x1, Y−y1) indicating sheet edge lower right coordinates. In other words, processing for replacing the coordinates indicating the sheet edge lower right position with the coordinates (X−x1, Y−y1) is performed. Also, on the other points, similar coordinate transformation processing is performed. The coordinates obtained by replacing the upper left coordinates with the lower right coordinates and the coordinates obtained by replacing the upper right coordinates with the lower left coordinates are stored.

A case where five double-sided charts for correction are read by the ADF will be described. Assume that the number of charts to be read matches the number of output charts.

Figure 17:
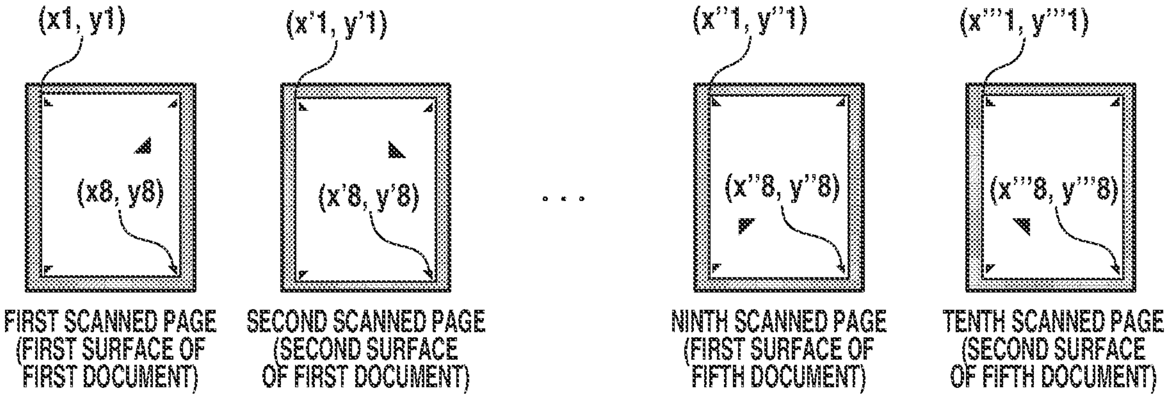
FIG. 17 illustrates coordinate information obtained when five correction charts are read.

FIG. 17 illustrates an example of coordinate information obtained when five correction charts are read. FIG. 17 illustrates read images on the first and fifth charts of the four double-sided pages obtained when the top and bottom and the front and back surfaces of the first chart are properly placed and the fifth chart is placed in the opposite orientation and the front and back surfaces of the fifth chart are properly set. Although not all of the images are illustrated, the coordinates of eight points, including the sheet edge coordinates and marker coordinates, are obtained as illustrated in FIG. 16 by sampling these images. The width of each image is represented by "X" and the height of each image is represented by "Y".

FIG. 18A illustrates a list of coordinate information before coordinate transformation. FIG. 18A illustrates examples of the marker coordinates and the sheet edge coordinates detected in step S504 and step S505, respectively, on the fourth page illustrated in FIG. 17. FIG. 18B illustrates a list of coordinate information after coordinate transformation. FIG. 18B illustrates the result of performing the processing illustrated in the flowchart of FIG. 15 on each page. The coordinate transformation processing is not performed on the first and second pages corresponding to the first chart that is set in the proper orientation, and the coordinate transformation processing is performed on the ninth and tenth pages corresponding to the fifth chart that is set in the opposite orientation. By the series of processing described above, the coordinates corresponding to the state where the images on all pages are set in the proper orientation are obtained. In step S1003, the CPU 111 acquires the measured value based on each formula illustrated in FIG. 10A. In step S507, the correction value is calculated based on the measured value.

Not only the above-described method, but also the following method may be used. That is, the identification patch sampling processing is first performed and the read image is rotated by 180 degrees before the marker sampling processing and the sheet edge sampling processing are performed. However, it may be desirable to perform sampling processing on a relatively high-resolution image to accurately perform image position adjustment processing, and it takes a lot of time to rotate the image. For this reason, the method of replacing the coordinates as described above is used in the present exemplary embodiment.

<Remarks>

By the above-described procedure, it is possible to determine the front and back surfaces of a sheet and the orientation of the sheet using patches that are hardly affected by a stripe-like pattern on the read image caused due to the presence of dust on the reading unit that is inherent in the ADF. Further, the top and bottom and the front and back surfaces of the read image can be determined and appropriate correction processing can be performed, thereby enabling the user to use this function without being aware of properly placing a document.

Other Exemplary Embodiments

The present disclosure can also be implemented by processing in which a program for implementing one or more functions according to the exemplary embodiments described above is supplied to a system or an apparatus via a network or a storage medium, and one or more processors in a computer of the system or the apparatus read out and execute the program. The present disclosure can also be implemented by a circuit (e.g., an application specific integrated circuit (ASIC)) for implementing one or more functions according to the exemplary embodiments.

The present disclosure may be applied to a system composed of a plurality of devices, and may also be applied to an apparatus composed of one device. For example, the functions according to the exemplary embodiments may be implemented by configuring some of software modules to be executed by an external server and acquiring the processing result from the external server. For example, a storage unit that stores data may be provided in the external server.

While the exemplary embodiments illustrate an example where image position adjustment processing is applied, the present disclosure can also be applied to other functions for performing correction processing by reading a chart using an ADF.

The present disclosure is not limited to the above-described exemplary embodiments, and various modifications (including organic combinations of the exemplary embodiments) can be made based on the scope of the present disclosure and are not eliminated from the scope of the present disclosure. In other words, combined configurations of the exemplary embodiments and the modifications thereof described above are all included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-020120, filed Feb. 14, 2022, No. 2022-020967, filed Feb. 15, 2022, No. 2022-030630, filed Mar. 1, 2022, and No. 2022-188903, filed Nov. 28, 2022, which are hereby incorporated by reference herein in their entirety.

What is claimed is:

1. An image forming apparatus comprising:

an image forming unit configured to form an image on a sheet;

a reading unit configured to read the image while conveying the sheet;

an execution unit configured to cause the image forming unit to execute image forming processing to form an image of a predetermined pattern on a sheet; and an acquiring unit configured to acquire an adjustment value to be used for further image forming processing based on a result of reading the sheet by the reading unit, the sheet having the image of the predetermined pattern formed thereon, wherein the image of the predetermined pattern includes a marker located near a corner of the sheet, and the marker is a area surrounded by a plurality of sides including a side that is parallel to a long side of the sheet, a side that is parallel to a short side of the sheet and a side that is not parallel to a short side and a long side of the sheet.

2. The image forming apparatus according to claim 1, wherein the image of the predetermined pattern includes markers located near four corners of the sheet.

3. The image forming apparatus according to claim 1, wherein the marker has a triangular shape.

4. The image forming apparatus according to claim 3, wherein the marker has an isosceles triangle shape.

5. The image forming apparatus according to claim 1, further comprising a detection unit configured to detect the marker by referring to pixels at predetermined intervals.

6. The image forming apparatus according to claim 1, wherein the image of the predetermined pattern further includes an identification patch, and the identification patch is used to determine front and back surfaces of the sheet.

7. The image forming apparatus according to claim 1, wherein the image of the predetermined pattern further includes an identification patch, and the identification patch is used to determine an orientation of the sheet.

8. The image forming apparatus according to claim 1, further comprising:

a display unit configured to display information; and a display control unit configured to cause the display unit to display a screen to prompt a user to place the sheet having the image of the predetermined pattern formed thereon on the reading unit.

9. The image forming apparatus according to claim 8, wherein the screen includes information about a direction of placement of the sheet having the image of the predetermined pattern formed thereon.

10. A control method for an image forming apparatus including an image forming unit configured to form an image on a sheet and a reading unit configured to read the image while conveying the sheet, the control method comprising:

causing the image forming unit to execute image forming processing to form an image of a predetermined pattern on a sheet; and causing the reading unit to read the image on the sheet having the image of the predetermined pattern formed thereon and acquiring an adjustment value to be used for further image forming processing based on a result of the reading, wherein the image of the predetermined pattern includes a marker located near a corner of the sheet, and the marker is an area surrounded by a plurality of sides including a side that is parallel to a long side of the sheet, a side that is parallel to a short side of the sheet and a side that is not parallel to a short side and a long side of the sheet.

* * * * *